(12) United States Patent
Aratake et al.

(10) Patent No.: US 12,338,015 B2
(45) Date of Patent: Jun. 24, 2025

(54) STORAGE DEVICE, UNMANNED AERIAL VEHICLE, AND SYSTEM

(71) Applicant: NIPPON TELEGRAPH AND TELEPHONE CORPORATION, Tokyo (JP)

(72) Inventors: Atsushi Aratake, Tokyo (JP); Yosuke Sakurada, Tokyo (JP); Daisuke Uchibori, Tokyo (JP); Yujin Hamano, Tokyo (JP); Kazuaki Watanabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/269,241

(22) PCT Filed: Dec. 24, 2020

(86) PCT No.: PCT/JP2020/048564
§ 371 (c)(1),
(2) Date: Jun. 22, 2023

(87) PCT Pub. No.: WO2022/137461
PCT Pub. Date: Jun. 30, 2022

(65) Prior Publication Data
US 2024/0300682 A1 Sep. 12, 2024

(51) Int. Cl.
*B64U 70/99* (2023.01)
*B64U 80/00* (2023.01)
(Continued)

(52) U.S. Cl.
CPC .............. *B64U 70/99* (2023.01); *B64U 80/00* (2023.01); *B64U 80/25* (2023.01); *B64U 10/14* (2023.01);
(Continued)

(58) Field of Classification Search
CPC .... B64U 70/99; B64U 80/25; B64U 2201/10; B64U 20/87; B64U 2101/70; B64U 2101/26; B64U 10/14
See application file for complete search history.

(56) References Cited

U.S. PATENT DOCUMENTS

2016/0144982 A1* 5/2016 Sugumaran ............. B64F 1/005
244/108
2016/0313744 A1 10/2016 Amelio et al.
(Continued)

FOREIGN PATENT DOCUMENTS

CN 105775116 A 7/2016
CN 109466808 A 3/2019
(Continued)

OTHER PUBLICATIONS

Unknown Author (2018) "[Drone technique] Drone hand catch method and necessity [Notes]" Skyfish's Drone Blog, Apr. 8, 2018 [online] website: https://www.droneskyfish.com/entry/hand-catch-drone.
(Continued)

*Primary Examiner* — Tye William Abell

(57) ABSTRACT

A storage device (10) that stores an unmanned aerial vehicle (30) includes a main body portion (20) having a magnet or a magnetic body (111, 112) for applying a magnetic force to the unmanned aerial vehicle (30) provided with a magnet (121, 122) on an upper surface.

18 Claims, 39 Drawing Sheets

(51) Int. Cl.
  *B64U 80/25* (2023.01)
  *B64U 10/14* (2023.01)
  *B64U 20/87* (2023.01)
  *B64U 101/26* (2023.01)
  *B64U 101/30* (2023.01)
  *B64U 101/70* (2023.01)

(52) U.S. Cl.
  CPC .......... *B64U 20/87* (2023.01); *B64U 2101/26* (2023.01); *B64U 2101/30* (2023.01); *B64U 2101/70* (2023.01); *B64U 2201/10* (2023.01)

(56) References Cited

U.S. PATENT DOCUMENTS

2020/0182846 A1* 6/2020 Jeong ................. G01N 33/0027
2020/0407078 A1* 12/2020 Shimamoto ............. B64F 1/222

FOREIGN PATENT DOCUMENTS

| JP | 2020519525 A | 7/2020 |
| JP | 2021008170 A | 1/2021 |

OTHER PUBLICATIONS

Kenta Tsuchiya (2017) "AIRMADA's Fully Autonomous Drone Station" literature, Jan. 18, 2017 [online] website: https://www.borg.media/airmada-2017-01-18/.

* cited by examiner

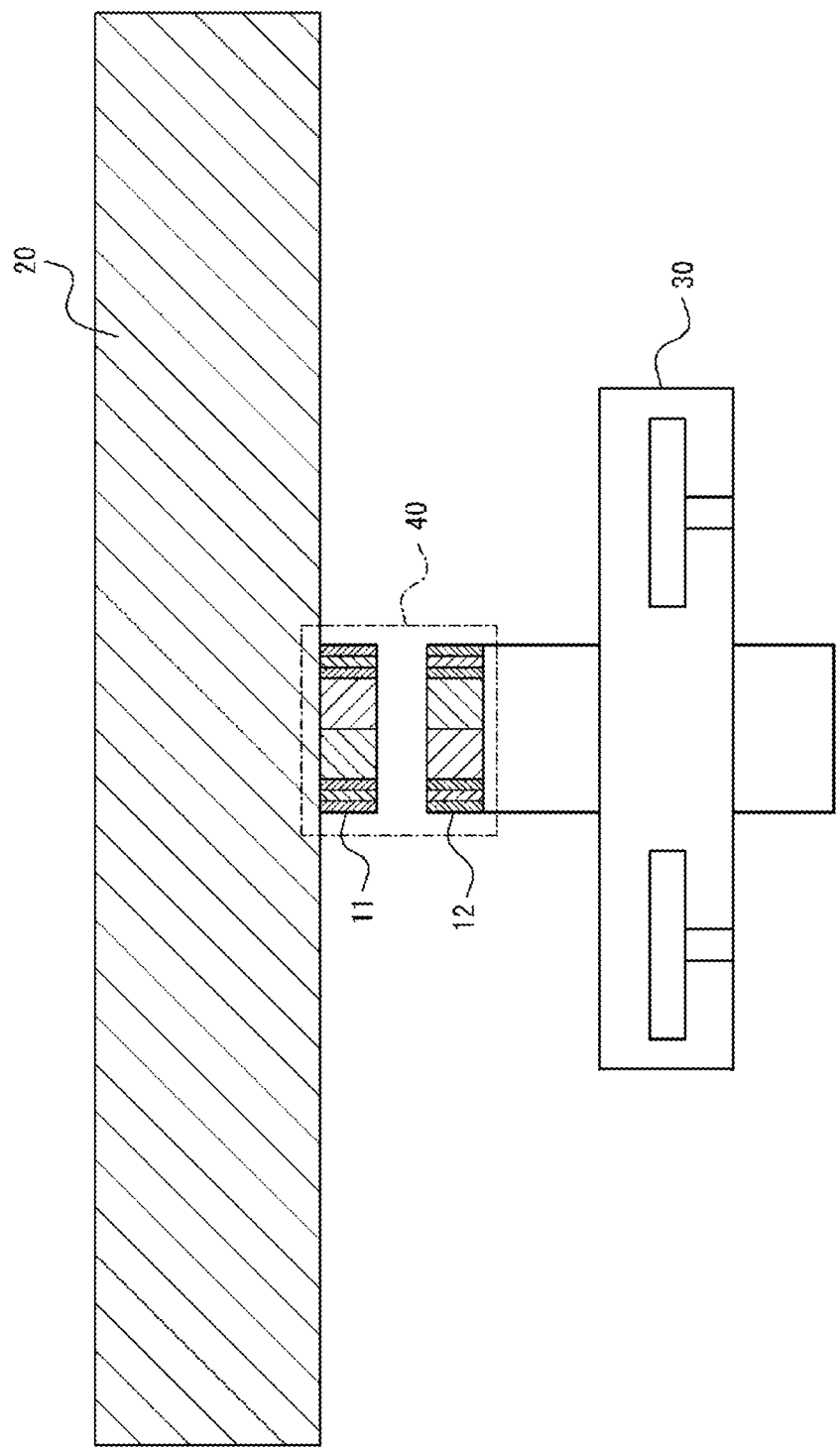

Fig. 14A
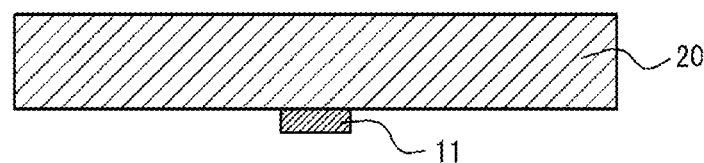
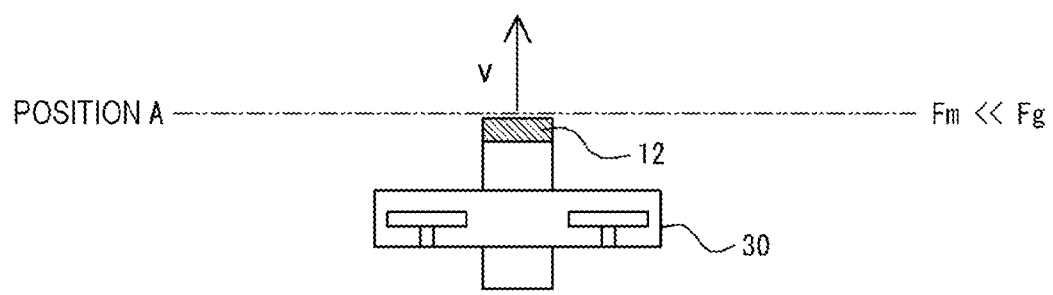

STORAGE DEVICE, UNMANNED AERIAL VEHICLE, AND SYSTEM

CROSS-REFERENCE TO RELATED APPLICATIONS

This application is a U.S. National Stage Application filed under 35 U.S.C. § 371 claiming priority to International Patent Application No. PCT/JP2020/048564, filed on 24 Dec. 2020, the disclosure of which is hereby incorporated herein by reference in its entirety.

TECHNICAL FIELD

The present disclosure relates to a storage device, an unmanned aerial vehicle, and a system.

BACKGROUND ART

In recent years, unmanned aerial vehicles (for example, drones, multicopters, or the like) that fly by rotation of a plurality of propellers have been able to be used for inspection of infrastructure structures.

As a method for bringing such an unmanned aerial vehicle into and out of storage, using manual hand release and catching is known (Non Patent Literature 1). As another method, it is known to use a ground station that is installed on the ground and autonomously stores an unmanned aerial vehicle (Non Patent Literature 2).

CITATION LIST

Non Patent Literature

Non Patent Literature 1: "[Drone Techniques] Method and Necessity of Hand Catching of Drones [Notes]," [online], Apr. 8, 2018, [Retrieved on Dec. 1, 2020], Internet <URL:https://www.droneskyfish.com/entry/hand-catch-drone>

Non Patent Literature 2: Kenta Tsuchiya, "AIRMADA's Fully Autonomous Drone Station," [online], Jan. 18, 2017, [Retrieved on Dec. 1, 2020], Internet <URL:https://www.borg.media/airmada-2017-01-18/>

SUMMARY OF INVENTION

Technical Problem

However, the method of using the hand release and catching requires human hands skilled in bringing unmanned aerial vehicles into and out of storage. Since it is assumed that the ground station is installed on the ground, when the ground station is used in an underground infrastructure facility, the unmanned aerial vehicle may be damaged by accumulated water generated due to water leakage or the like.

An object of the present disclosure is to provide a storage device, an unmanned aerial vehicle, and a system capable of safely performing departure and return operations of an unmanned aerial vehicle without human intervention regardless of whether the unmanned aerial vehicle is under the ground or on the ground, or indoors or outdoors.

Solution to Problem

According to an embodiment, there is provided a storage device that stores an unmanned aerial vehicle, the storage device including a main body portion having a magnet or a magnetic body for applying a magnetic force to the unmanned aerial vehicle provided with a magnet on an upper surface.

According to an embodiment, there is provided an unmanned aerial vehicle including a propeller, and a main body portion having a plurality of magnets on an upper surface.

According to another embodiment, there is provided a system including the storage device and the unmanned aerial vehicle.

Advantageous Effects of Invention

According to the embodiments of the present disclosure, it is possible to safely perform departure and return operations of the unmanned aerial vehicle without human intervention regardless of whether the unmanned aerial vehicle is under the ground or on the ground, or indoors or outdoors.

BRIEF DESCRIPTION OF DRAWINGS

FIG. 8 is a view illustrating an example of a vertical cross-sectional view of the main body portion of the storage device and the unmanned aerial vehicle.

FIG. 14A is a view for describing a state in which the unmanned aerial vehicle returns to the storage device.

DESCRIPTION OF EMBODIMENTS

Figure 1:
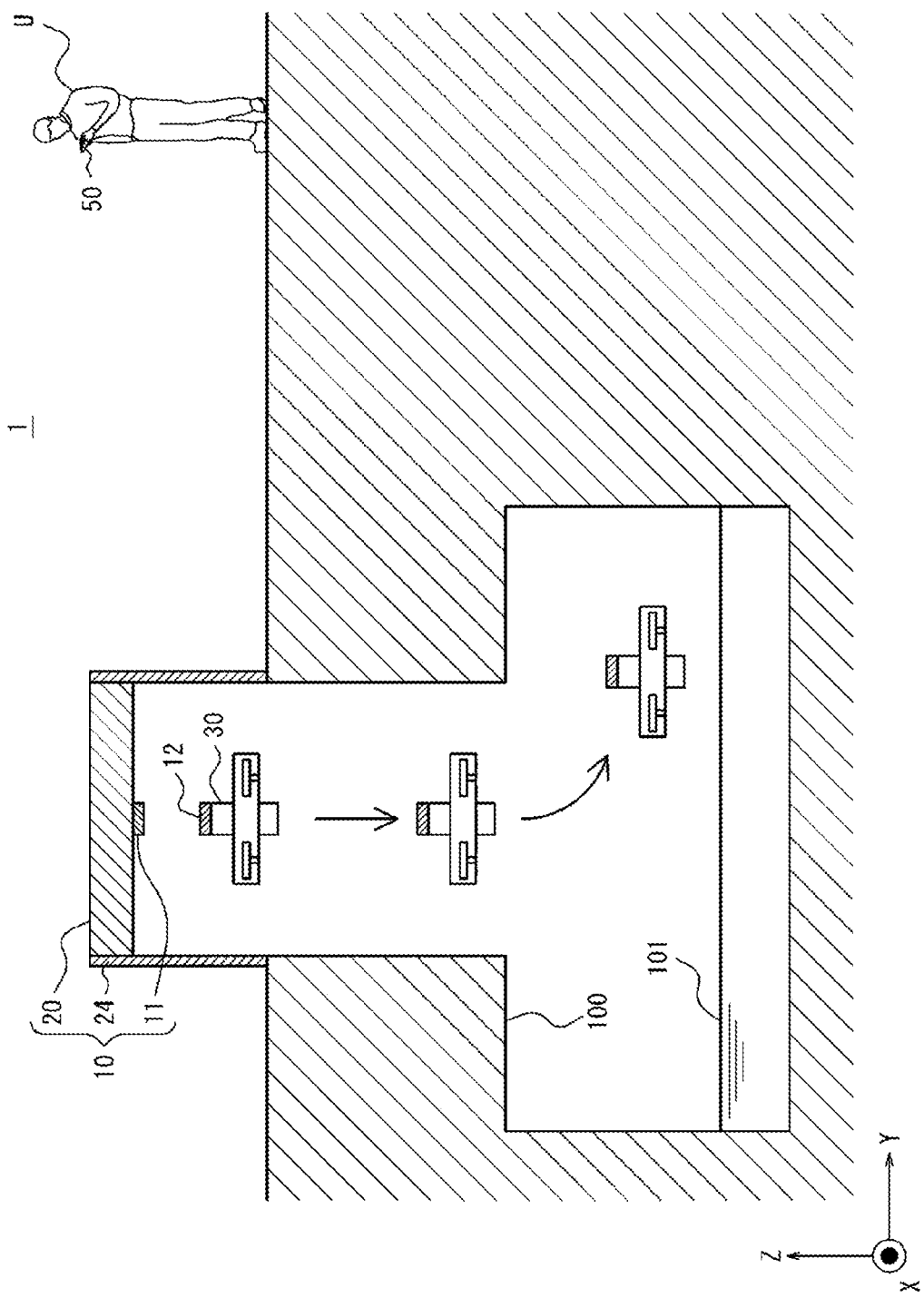
FIG. 1 is a view illustrating an outline of an inspection system according to an embodiment of the present disclosure.

Hereinafter, a storage device according to the present disclosure will be described in detail with reference to the drawings. Note that the drawings only schematically illustrate to the extent that the present invention can be sufficiently understood. Thus, the present invention is not limited only to the illustrated examples. In addition, for convenience of illustration, scales in the drawings may be different from actual scales.

(Inspection System)

First, an inspection system using a storage device according to the present disclosure will be described. FIG. 1 is a view illustrating an outline of an inspection system 1. The inspection system 1 illustrated in FIG. 1 includes a storage device 10 and an unmanned aerial vehicle 30. The inspection system 1 may further include a terminal 50. Note that FIG. 1 illustrates a case where the number of unmanned aerial vehicles 30 is one, but the number of the unmanned aerial vehicles 30 may be plural.

A removable lid is placed on an opening of a manhole 100 so as to close an entrance of the manhole 100. The storage device 10 has a structure that can be installed in place of the lid of the manhole 100. FIG. 1 illustrates a state in which the storage device 10 is installed in place of the lid of the manhole 100, that is, a state in which a main body portion 20 of the storage device 10 is installed above an upper hole of the manhole 100. However, the storage device 10 is not limited to the case of being installed in place of the lid of the manhole 100, and can be installed at any place regardless of whether it is under the ground or on the ground, or indoors or outdoors.

The manhole 100 is, for example, a communication manhole. The manhole 100 may be referred to as a maintenance hole. In the infrastructure facility in the manhole 100, accumulated water 101 due to water leakage or the like may be generated.

The terminal 50 is carried and operated by an operator (for example, an inspector) U of the unmanned aerial vehicle 30. Wireless communication is performed between the terminal 50 and the unmanned aerial vehicle 30. The operator U operates the terminal 50 to control the operation of the unmanned aerial vehicle 30. The unmanned aerial vehicle 30 can fly even without an instruction related to flight control from the terminal 50.

In the inspection system 1, the unmanned aerial vehicle 30 captures an image of the inside of the manhole 100 (in other words, an aerial image) while autonomously controlling the flight or controlling the flight according to the operation of the terminal 50 by the operator U. The unmanned aerial vehicle 30 may transmit the captured image data to the terminal 50. The operator U inspects the inside of the manhole 100 by checking the image data captured by the unmanned aerial vehicle 30. Note that items to be inspected by the operator U are, for example, the presence or absence of abnormality of the inner wall (that is, the wall surface) of the manhole 100, the state of groundwater stored in the underground passage leading to the manhole 100, the state of an object (structures, devices, or the like) installed in the manhole 100, and the like.

The storage device 10 that stores the unmanned aerial vehicle 30 includes the main body portion 20 having a magnet or a magnetic body for applying a magnetic force to the unmanned aerial vehicle 30 provided with a magnet on an upper surface. When the upper surface of the unmanned aerial vehicle 30 approaches the main body portion 20, an attractive force based on a magnetic force is mutually applied, and therefore the unmanned aerial vehicle 30 can be fixed to the lower surface of the main body portion 20. Therefore, with the storage device 10 according to the present embodiment, it is possible to safely perform departure and return operations of the unmanned aerial vehicle 30 without human intervention regardless of whether the unmanned aerial vehicle is under the ground or on the ground, or indoors or outdoors.

(Unmanned Aerial Vehicle)

Figure 2:
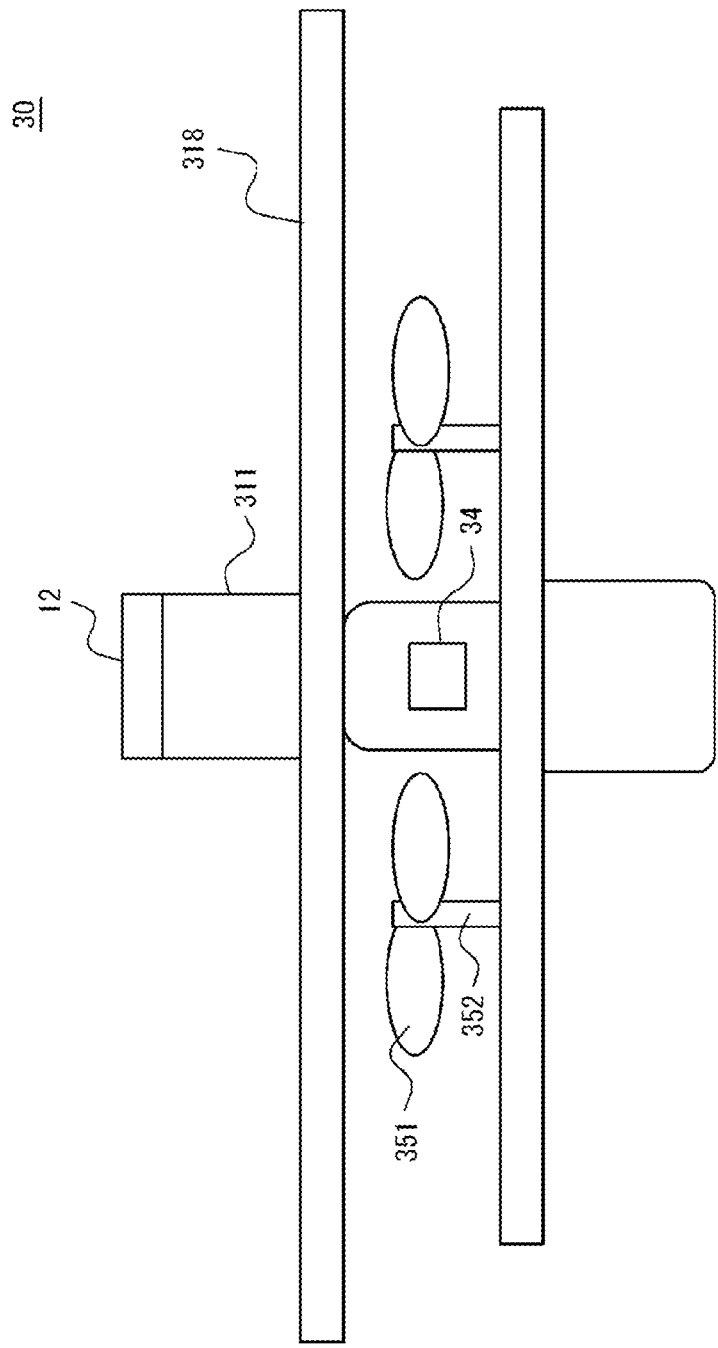
FIG. 2 is a front view illustrating an appearance example of an unmanned aerial vehicle according to the embodiment of the present disclosure.

FIG. 2 is a front view illustrating an appearance example of the unmanned aerial vehicle 30. As illustrated in FIG. 2, the unmanned aerial vehicle 30 includes a control box 311 incorporating a control board, a plurality of propellers (rotary blades) 351 pivotally supported by a motor 352, a buffer bumper 318 that absorbs vibration and impact, a camera 34, and a connection portion 12. The unmanned aerial vehicle 30 may include a plurality of cameras 34. The connection portion 12 is provided on the upper surface of the unmanned aerial vehicle 30.

Figure 3:
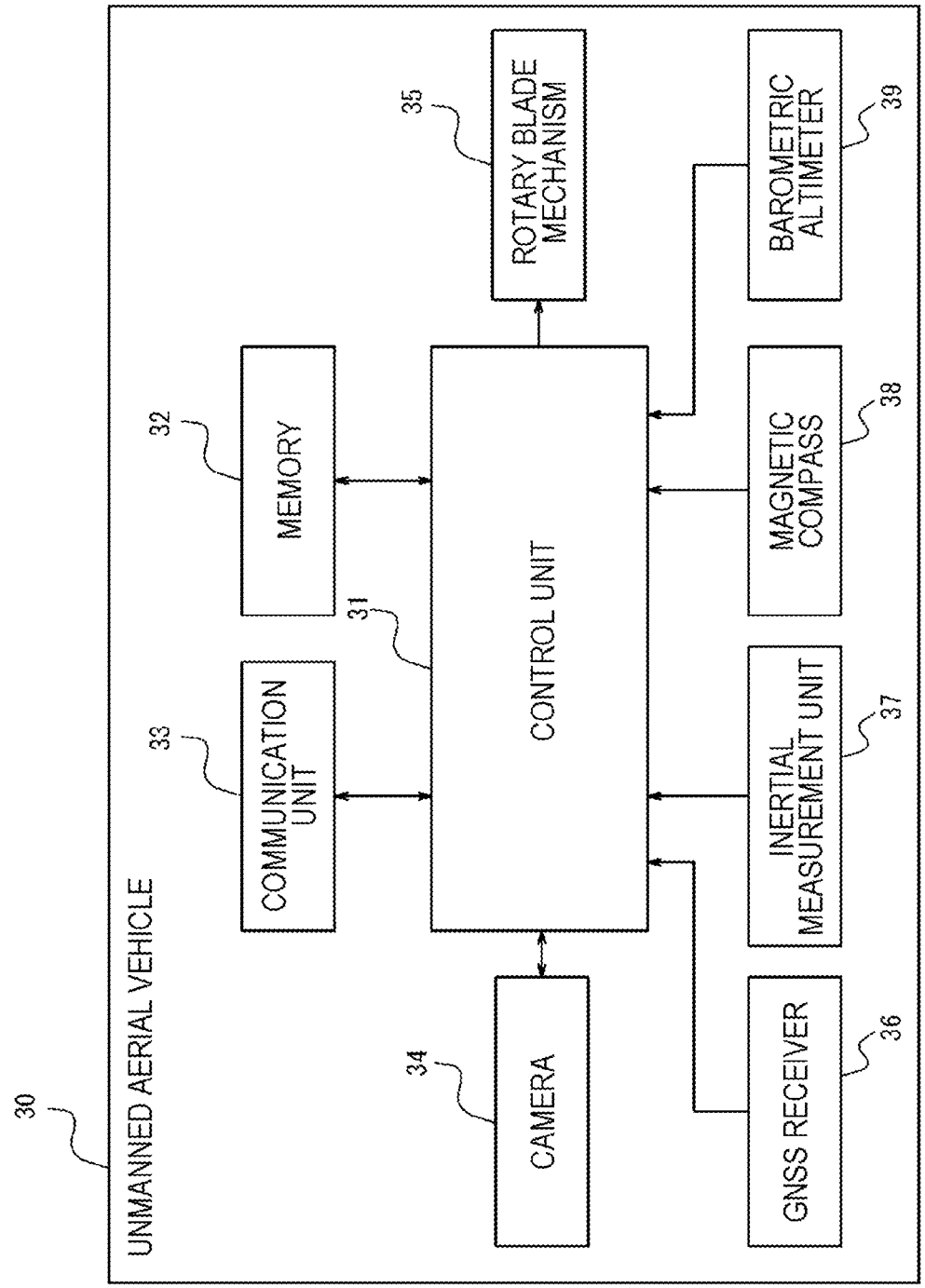
FIG. 3 is a block diagram illustrating an internal configuration example of the unmanned aerial vehicle according to the embodiment of the present disclosure.

FIG. 3 is a block diagram illustrating an internal configuration example of the unmanned aerial vehicle 30. The unmanned aerial vehicle 30 includes a control unit 31, a memory 32, a communication unit 33, a camera 34, a rotary blade mechanism 35, a global navigation satellite system (GNSS) receiver 36, an inertial measurement unit (IMU) 37, a magnetic compass 38, and a barometric altimeter 39.

The communication unit 33 performs wireless communication with the terminal 50. Examples of the wireless communication method include a wireless LAN such as Wi-Fi (registered trademark) or specified low power radio communication.

The camera 34 captures an image of the surroundings of the unmanned aerial vehicle 30 and generates data of the captured image. The image data of the camera 34 is stored in the memory 32.

The rotary blade mechanism 35 includes a plurality of (for example, four) propellers 351 and a plurality of (for example, four) motors 352 that rotate the plurality of propellers 351.

The GNSS receiver 36 receives a plurality of signals indicating times transmitted from GNSS satellites which are a plurality of navigation satellites and positions (for example, coordinates) of the GNSS satellites. The GNSS receiver 36 calculates the position (that is, the position of the unmanned aerial vehicle 30) of the GNSS receiver 36 on the basis of the plurality of received signals. The GNSS receiver 36 outputs the position information of the unmanned aerial vehicle 30 to the control unit 31.

The inertial measurement unit 37 detects the attitude of the unmanned aerial vehicle 30 and outputs a detection result to the control unit 31. The inertial measurement unit 37 detects, as the attitude of the unmanned aerial vehicle 30, accelerations in three axial directions of forward and rearward, left and right, and up and down of the unmanned aerial vehicle 30, and angular velocities in three axial directions of a pitch axis, a roll axis, and a yaw axis. The inertial measurement unit 37 can be implemented by, for example, a semiconductor sensor capable of measuring slow movement.

The magnetic compass 38 detects a direction of the heading of the unmanned aerial vehicle 30, and outputs a detection result to the control unit 31. The barometric altimeter 39 detects an altitude at which the unmanned aerial vehicle 30 is flying, and outputs a detection result to the control unit 31.

The memory 32 stores computer programs (programs) and the like necessary for the control unit 31 to control the camera 34, the rotary blade mechanism 35, the GNSS receiver 36, the inertial measurement unit 37, the magnetic compass 38, and the barometric altimeter 39. The memory 32 may be a computer-readable recording medium. The memory 32 may be provided inside the unmanned aerial vehicle 30 or may be provided detachably from the unmanned aerial vehicle 30.

In the present embodiment, the control unit 31 is a processor such as a central processing unit (CPU), a micro processing unit (MPU), a graphics processing unit (GPU), a digital signal processor (DSP), or a system on a chip (SoC), and may be configured by a plurality of processors of the same or different types. The control unit 31 may be configured by dedicated hardware such as an application specific integrated circuit (ASIC), a field-programmable gate array (FPGA), or the like.

The control unit 31 performs signal processing for integrally controlling the operation of each unit of the unmanned aerial vehicle 30, data input/output processing with other units, and data calculation processing. The control unit 31 controls autonomous flight of the unmanned aerial vehicle 30 according to a computer program stored in the memory 32. When autonomously flying, the control unit 31 refers to data such as a flight path and a flight time stored in the memory 32. Note that the control unit 31 may control the flight of the unmanned aerial vehicle 30 in accordance with a command received from the terminal 50 via the communication unit 33.

The control unit 31 acquires and analyzes image data captured by the camera 34 to specify the environment around the unmanned aerial vehicle 30. The control unit 31 controls the flight to avoid an obstacle, for example, on the basis of the environment around the unmanned aerial vehicle 30. The control unit 31 controls the rotary blade mechanism 35 to control the flight of the unmanned aerial vehicle 30. In the flight control, the position including the latitude, longitude, and altitude of the unmanned aerial vehicle 30 is changed.

The program may be recorded in a recording medium readable by the computer (the unmanned aerial vehicle 30). Using such a recording medium makes it possible to install the program in the computer. Here, the recording medium on which the program is recorded may be a non-transitory recording medium. The non-transitory recording medium is not particularly limited, but may be, for example, a CD-ROM, a DVD-ROM, a Universal Serial Bus (USB) memory, or the like. The program may be downloaded from an external device via a network.

(Storage Device)

Figure 4A:
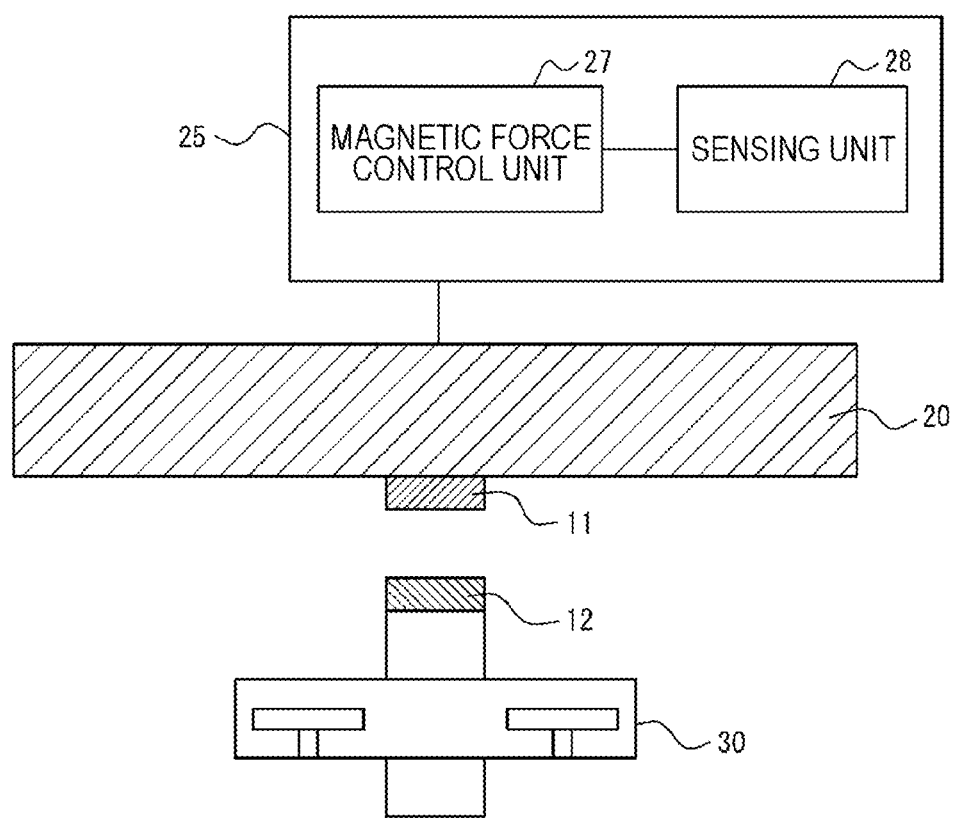
FIG. 4A is a view illustrating a configuration example of a storage device according to the embodiment of the present disclosure.
Figure 4B:
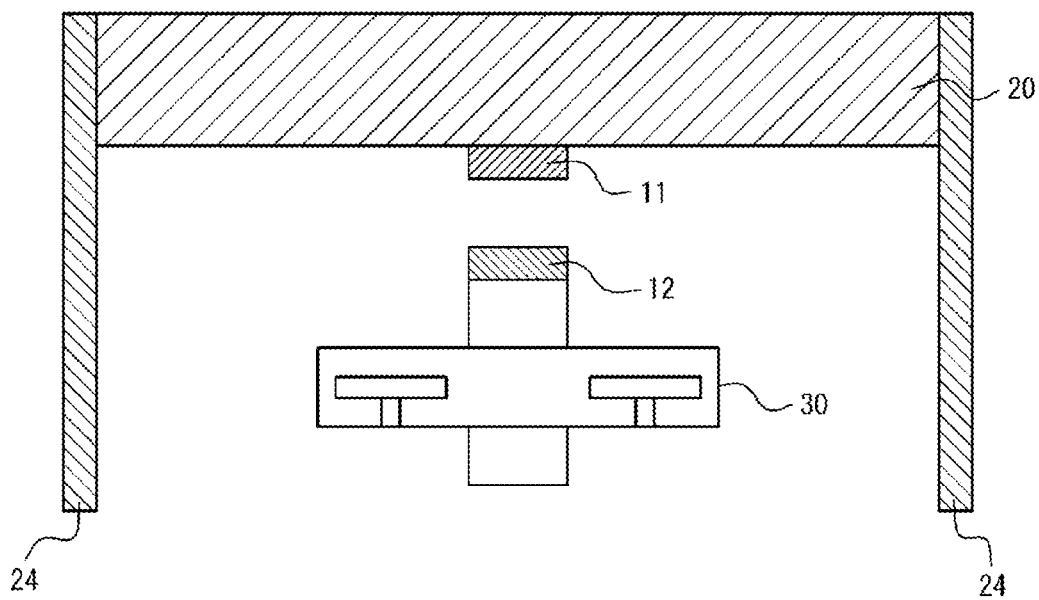
FIG. 4B is a view illustrating a configuration example of a storage device according to the embodiment of the present disclosure.

FIGS. 4A and 4B are views illustrating a configuration example of a storage device 10 according to the embodiment of the present disclosure. In FIG. 4A, the storage device 10 includes a main body portion 20 and connection portions 11 and 12. The connection portion 11 is a portion where the main body portion 20 is connected to the upper surface of the unmanned aerial vehicle 30, and is provided on the lower surface of the main body portion 20. The connection portion 11 has a magnet or a magnetic body for applying a magnetic force to the unmanned aerial vehicle 30 provided with a magnet on its upper surface. The connection portion 12 is a portion connected to the connection portion 11 of the main body portion 20, and is provided on the upper surface of the unmanned aerial vehicle 30. The connection portion 12 is provided with a magnet. The main body portion 20 includes a control unit 25 including a magnetic force control unit 27 and a sensing unit 28. The sensing unit 28 detects an operation of the propeller 351 included in the unmanned aerial vehicle 30, a movement of the unmanned aerial vehicle 30, or the like. The sensing unit 28 can be implemented using, for example, an infrared sensor, a distance measuring sensor, or the like. The magnetic force control unit 27 controls an operation of an electromagnet to be described later on the basis of the operation of the propeller 351, the movement of the unmanned aerial vehicle 30, or the like detected by the sensing unit 28. In the present embodiment, the magnetic force control unit 27 is a processor such as a CPU, an MPU, a GPU, a DSP, or an SoC, and may be configured by a plurality of processors of the same type or different types. The magnetic force control unit 27 may be configured by dedicated hardware such as an ASIC or an FPGA.

The main body portion 20 is placed on a ceiling of a cable tunnel or hardware, a back surface of a bridge, a manhole upper floor slab, an iron lid, or the like, and is intended to store the unmanned aerial vehicle 30. Since the main body portion 20 is attached to a facility, it is desirable to have a simple shape such as a plate shape.

An airflow hood 24 may be provided in one side or the entire surface of the main body portion 20 so as not to be affected by the flow of air before and after the operation of launching and storing the unmanned aerial vehicle 30. FIG. 4B illustrates an example of a storage device 10 with airflow hoods 24. The airflow hood 24 may be provided integrally with the main body portion 20 or may be provided separately.

(Connection Portion)

Figure 5A:
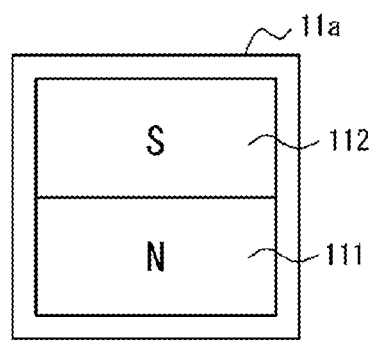
FIG. 5A is a view illustrating a configuration example of a connection portion having magnets provided in a main body portion of the storage device.
Figure 5B:
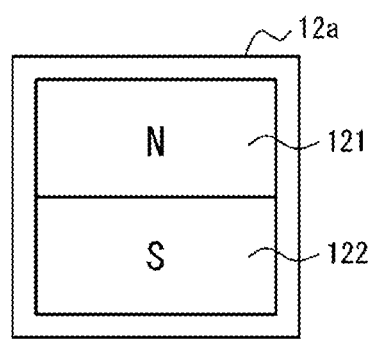
FIG. 5B is a view illustrating a configuration example of a connection portion having magnets provided in an upper surface portion of the unmanned aerial vehicle.
Figure 5C:
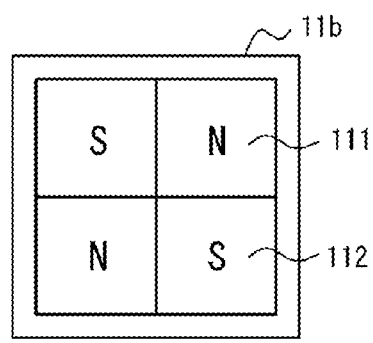
FIG. 5C is a view illustrating a configuration example of a connection portion having magnets provided in the main body portion of the storage device.
Figure 5D:
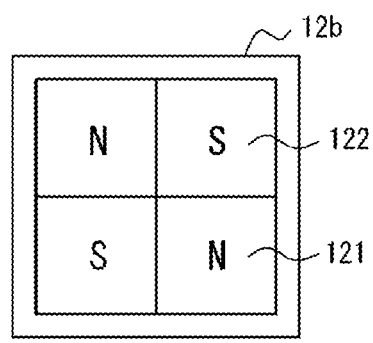
FIG. 5D is a view illustrating a configuration example of a connection portion having magnets provided in the upper surface portion of the unmanned aerial vehicle.

Next, configurations of the connection portion 11 provided in the main body portion 20 of the storage device 10 and the connection portion 12 provided on the upper surface of the unmanned aerial vehicle 30 will be described. FIGS. 5A and 5C are views illustrating a configuration example of a connection portion 11 having magnets provided in the main body portion 20 of the storage device 10. FIGS. 5B and 5D are views illustrating a configuration example of a connection portion 12 having magnets provided in the upper surface portion of the unmanned aerial vehicle 30. Both the connection portion 11 and the connection portion 12 have magnets so that the N pole and the S pole are arranged vertically so as to exert a magnetic force in the vertical direction. FIGS. 5A and 5C are perspective views of the lower magnet of the connection portion 11 as viewed from above. FIGS. 5B and 5D are perspective views of the upper magnet of the connection portion 12 as viewed from above. These magnets may be implemented by permanent magnets or electromagnets.

FIGS. 5A and 5B illustrate examples in which magnets are arranged with two poles. A connection portion 11a in FIG. 5A includes a magnet 111 having an S pole on an upper side and an N pole on a lower side, and a magnet 112 having an S pole on a lower side and an N pole on an upper side. A connection portion 12a in FIG. 5B includes a magnet 121 having an N pole on an upper side and an S pole on a lower side, and a magnet 122 having an N pole on a lower side and an S pole on an upper side. The connection portion 11a and the connection portion 12a correspond to each other, and when the connection portion 11a and the connection portion 12a are brought close to each other in the directions illustrated in FIGS. 5A and 5B, an attractive force is mutually applied, and the connection portion 11a and the connection portion 12a can be connected to each other.

FIGS. 5C and 5D illustrate examples in which the magnets are arranged with four poles. A connection portion 11b in FIG. 5C includes two magnets 111 having an S pole on an upper side and an N pole on a lower side, and two magnets 112 having an S pole on a lower side and an N pole on an upper side. A connection portion 12b in FIG. 5D includes two magnets 121 having an N pole on an upper side and an S pole on a lower side, and two magnets 122 having an N pole on a lower side and an S pole on an upper side. The connection portion 11b and the connection portion 12b correspond to each other, and when the connection portion 11b and the connection portion 12b are brought close to each other in the directions illustrated in FIGS. 5C and 5D, an attractive force is mutually applied, and the connection portion 11b and the connection portion 12b can be connected to each other.

As illustrated in FIGS. 5A to 5D, in the connection portion 12 of the unmanned aerial vehicle 30, a plurality of magnets are arranged in multiple poles such that the number of poles is 2 or more. In the connection portion 11 of the main body portion 20, a plurality of magnets are arranged in multiple poles with a polarity opposite to that of the connection portion 12 of the unmanned aerial vehicle 30. Such a multipolar arrangement may be implemented by multipolar magnetization, arrangement of a plurality of magnets, or control of a current direction flowing in an electromagnet. Note that, by arranging the poles in an even-numbered array, it is possible to allow a yaw rotation angle shift of the unmanned aerial vehicle 30 up to 45 degrees as an effect of alignment.

Figure 6A:
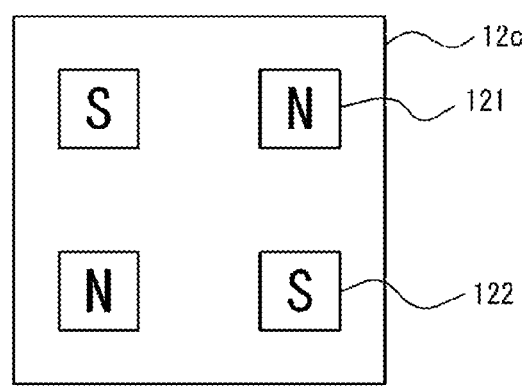
FIG. 6A is a view illustrating a configuration example of a connection portion having magnets provided in the upper surface portion of the unmanned aerial vehicle.
Figure 6B:
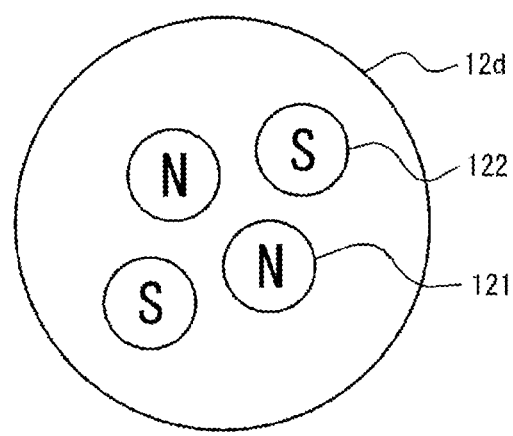
FIG. 6B is a view illustrating a configuration example of a connection portion having magnets provided in the upper surface portion of the unmanned aerial vehicle.
Figure 6C:
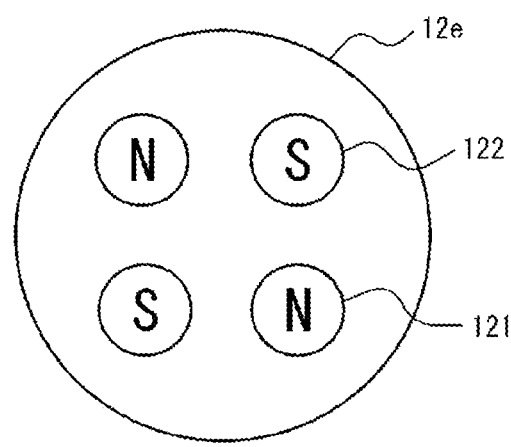
FIG. 6C is a view illustrating a configuration example of a connection portion having magnets provided in the upper surface portion of the unmanned aerial vehicle.

FIGS. 6A to 6C are views illustrating another configuration example of the connection portion 12 having the magnets 121 and 122 provided in the upper surface portion of the unmanned aerial vehicle 30. The magnets arranged in a multipolar array in the connection portion 12 may not be directly multipolar magnetized, and a plurality of separate magnets may be arranged. FIG. 6A illustrates an example of a connection portion 12c in which a plurality of separate magnets are arranged. Although FIGS. 5A to 5D illustrate an example in which the shapes of the connection portion 11 and the connection portion 12 are quadrangular, the shapes of the connection portion 11 and the connection portion 12 are not limited to the quadrangular shape. For example, the shapes of the connection portion 11 and the connection portion 12 may be any shape as long as a plurality of magnets are arranged in a multipolar array such as a circular shape or a polygonal shape. FIG. 6B illustrates an example of a connection portion 12d in a case where the shape of the connection portion 12 is circular. The center points of the magnetic forces can be set at arbitrary intervals, but it is desirable that the same poles be equally spaced. Further, by arranging the plurality of magnets at equal intervals without distinguishing the S pole and the N pole, isotropy of the unmanned aerial vehicle 30 with respect to the yaw rotation can be enhanced. FIG. 6C illustrates an example of the connection portion 12 in which the plurality of magnets 121 and 122 are arranged at equal intervals without distinguishing the polarity. In the connection portion 11 of the main body portion 20, magnets are arranged in multiple poles so that the polarity is opposite to that of the connection portion 12.

As illustrated in FIGS. 5A to 6C, the main body portion 20 may have the same number of magnets as the magnets provided on the upper surface of the unmanned aerial vehicle 30. Furthermore, the plurality of magnets included in the main body portion 20 may be arranged such that the arrangement of the magnet 112 having the N pole on the upper side and the magnet 111 having the S pole on the upper side is the same as the arrangement of the magnet 121 having the N pole on the upper side and the magnet 122 having the S pole on the upper side provided on the upper surface of the unmanned aerial vehicle 30 at least once or more while the unmanned aerial vehicle 30 makes one rotation about the vertical axis. Accordingly, there is at least one arrangement in which all the magnets of the connection portion 11 of the main body portion 20 and all the magnets of the connection portion 12 of the unmanned aerial vehicle 30 exert attractive forces. Therefore, the unmanned aerial vehicle 30 can be stably fixed to the main body portion 20 in a specific positional relationship. In addition, the plurality of magnets included in the main body portion 20 may be arranged such that the arrangement of the magnet 112 and the magnet 111 is the same as the arrangement of the magnet 121 and the magnet 122 provided on the upper surface of the unmanned aerial vehicle 30 a plurality of times while the unmanned aerial vehicle 30 makes one rotation about the vertical axis. Accordingly, the unmanned aerial vehicle 30 can be stably fixed to the main body portion 20 in a plurality of predetermined positional relationships. In addition, the main body portion 20 may have the same number of magnets 112 having N poles on the upper side and the same number of magnets 111 having S poles on the upper side. Accordingly, it is possible to prevent the main body portion 20 and the unmanned aerial vehicle 30 from being incompletely connected.

In this manner, the magnet provided in the connection portion 11 of the main body portion 20 and the magnet provided in the connection portion 12 of the unmanned aerial vehicle 30 exert an attractive force, and thus the connection portion 11 and the connection portion 12 are in close contact with each other in a specific positional relationship. Therefore, when the connection portion 11 and the connection portion 12 are connected, the electrodes of the connection portion 11 and the connection portion 12 may be provided so as to supply power from the connection portion 11 to the connection portion 12. That is, the main body portion 20 may further include an electrode for supplying power to the electrode provided on the upper surface when the plurality of magnets included in the main body portion 20 exert an attractive force on the magnet provided on the upper surface of the unmanned aerial vehicle 30 and the main body portion 20 and the upper surface come into contact with each other. FIGS. 7A, 7C, 7E, 7G, and 7I are views illustrating a configuration example of a connection portion 11 having magnets 111 and 112 and electrodes 115 and 116 provided in the main body portion 20 of the storage device 10. FIGS. 7B, 7D, 7F, 7H, and 7J are views illustrating a configuration example of a connection portion 12 having magnets 121 and 122 and electrodes 125 and 126 provided in the upper surface portion of the unmanned aerial vehicle 30. In FIGS. 7A, 7C, 7E, 7G, and 7I, the electrode 115 of the connection portion 11 is a positive electrode, and is connected to the electrode 125 of the connection portion 12 in FIGS. 7B, 7D, 7F, 7H, and 7J. In FIGS. 7A, 7C, 7E, 7G, and 7I, the electrode 116 of the connection portion 11 is a negative electrode, and is connected to the electrode 126 of the connection portion 12 in FIGS. 7B, 7D, 7F, 7H, and 7J. These electrodes are used to supply, from the main body portion 20, power for flying, illuminating, sensing, capturing an image, driving an electromagnet, and the like of the unmanned aerial vehicle 30.

Figure 7A:
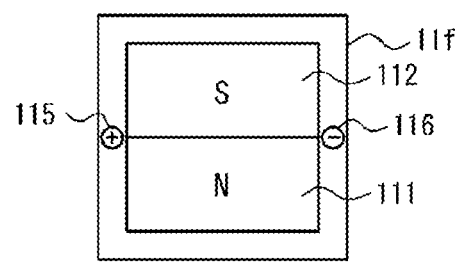
FIG. 7A is a view illustrating a configuration example of a connection portion having magnets and electrodes provided in the main body portion of the storage device.
Figure 7B:
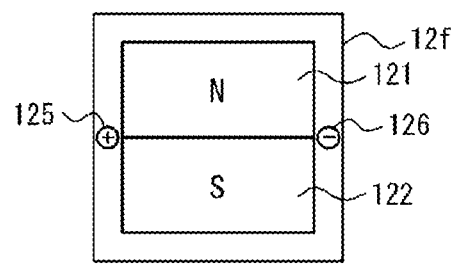
FIG. 7B is a view illustrating a configuration example of a connection portion having magnets and electrodes provided in the upper surface portion of the unmanned aerial vehicle.

FIGS. 7A and 7B illustrate an example in which connection portions 11f and 12f corresponding to each other have an electrode arrangement in a two-pole arrangement. In this configuration, the electrode used for charging the battery of the unmanned aerial vehicle 30 is arranged in both the unmanned aerial vehicle 30 and the main body portion 20 by utilizing the fact that the yaw rotation can be uniquely determined by the multipolar array.

Figure 7C:
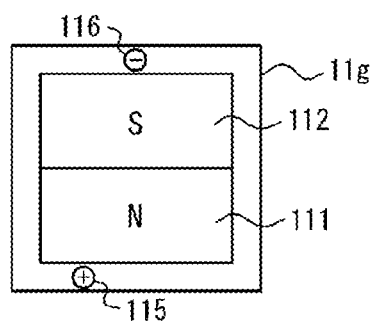
FIG. 7C is a view illustrating a configuration example of a connection portion having magnets and electrodes provided in the main body portion of the storage device.
Figure 7D:
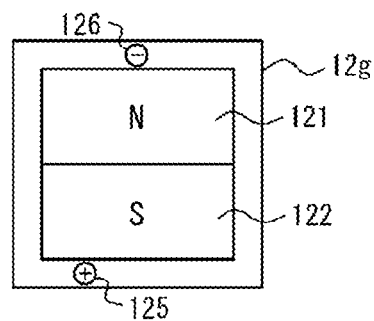
FIG. 7D is a view illustrating a configuration example of a connection portion having magnets and electrodes provided in the upper surface portion of the unmanned aerial vehicle.

FIGS. 7C and 7D illustrate an example in which connection portions 11g and 12g corresponding to each other arrange the electrodes 115, 116, 125, and 126 at non-point target positions. The electrodes 115, 116, 125, and 126 can be arranged at any position that does not interfere with the magnetic force, such as up and down and diagonal. Therefore, by installing the electrodes 115, 116, 125, and 126 at a position that is not point-symmetric with respect to the centers of the connection portions 11 and 12, it is possible to prevent short-circuiting even when the unmanned aerial vehicle 30 rotates by 180 degrees due to an error in the polarity of NS.

Figure 7E:
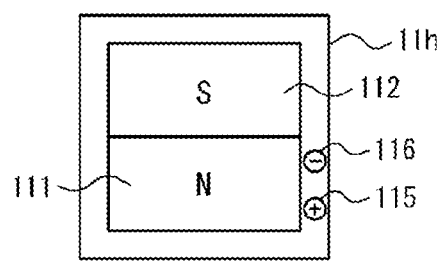
FIG. 7E is a view illustrating a configuration example of a connection portion having magnets and electrodes provided in the main body portion of the storage device.
Figure 7F:
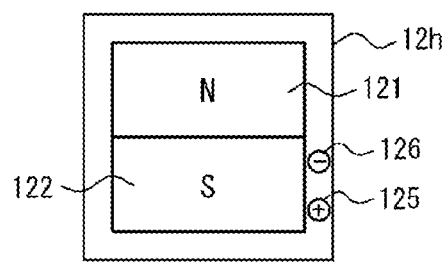
FIG. 7F is a view illustrating a configuration example of a connection portion having magnets and electrodes provided in the upper surface portion of the unmanned aerial vehicle.

FIGS. 7E and 7F illustrate an example in which connection portions 11h and 12h corresponding to each other arrange the electrodes 115, 116, 125, and 126 at positions close to each other in substantially the same direction as viewed from the centers of the connection portions 11 and 12. If the electrodes 115, 116, 126, and 126 are not at a high voltage, the positive and negative electrodes can be arranged at positions close to each other in substantially the same direction.

Figure 7G:
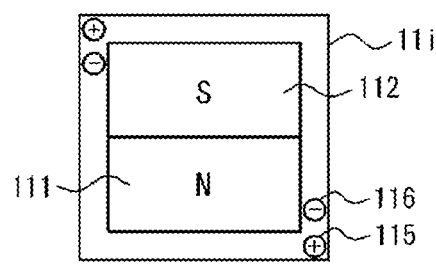
FIG. 7G is a view illustrating a configuration example of a connection portion having magnets and electrodes provided in the main body portion of the storage device.
Figure 7H:
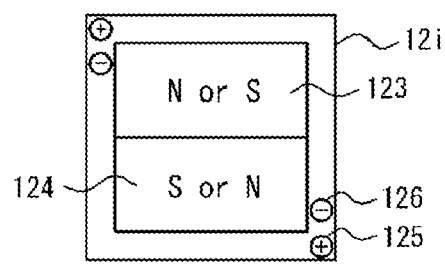
FIG. 7H is a view illustrating a configuration example of a connection portion having magnets and electrodes provided in the upper surface portion of the unmanned aerial vehicle.

FIGS. 7G and 7H illustrate an example in which connection portions 11i and 12i corresponding to each other arrange the plurality of electrodes 115, 116, 125, and 126 in a two-pole arrangement. By using electromagnets whose polarity can be changed as magnets 123 and 124 on the unmanned aerial vehicle 30 side or by mechanically inverting the magnets, the unmanned aerial vehicle 30 can return to the main body portion 20 in a state of being rotated by 180 degrees. In this case, a plurality of electrode pairs of at least one of the main body portion 20 and the unmanned aerial vehicle 30 are arranged, and charging is possible even in a state of being rotated by 180 degrees.

Figure 7I:
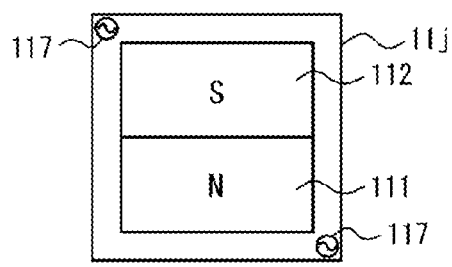
FIG. 7I is a view illustrating a configuration example of a connection portion having magnets and electrodes provided in the main body portion of the storage device.
Figure 7J:
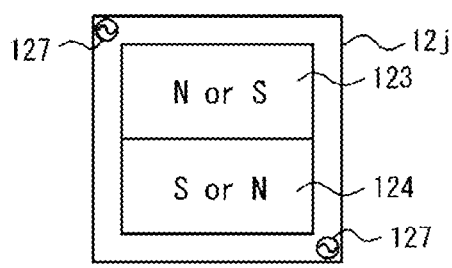
FIG. 7J is a view illustrating a configuration example of a connection portion having magnets and electrodes provided in the upper surface portion of the unmanned aerial vehicle.

FIGS. 7I and 7J illustrate an example in which connection portions 11j and 12j corresponding to each other arrange alternating-current electrodes 117 and 127 at non-point target positions. In the case where the polarity of the electrode is variable or in the case of charging by alternating current, it is not necessary to provide a plurality of electrode pairs by arranging the electrodes at point-symmetrical positions.

Next, the structure of the electrodes of the connection portions 11 and 12 will be described. FIG. 8 is a diagram illustrating an example of a vertical cross-sectional view of the main body portion 20 of the storage device 10 and the unmanned aerial vehicle 30. In FIG. 8, in a space 40, the connection portion 11 of the main body portion 20 and the connection portion 12 of the unmanned aerial vehicle 30 face each other.

Figure 9A:
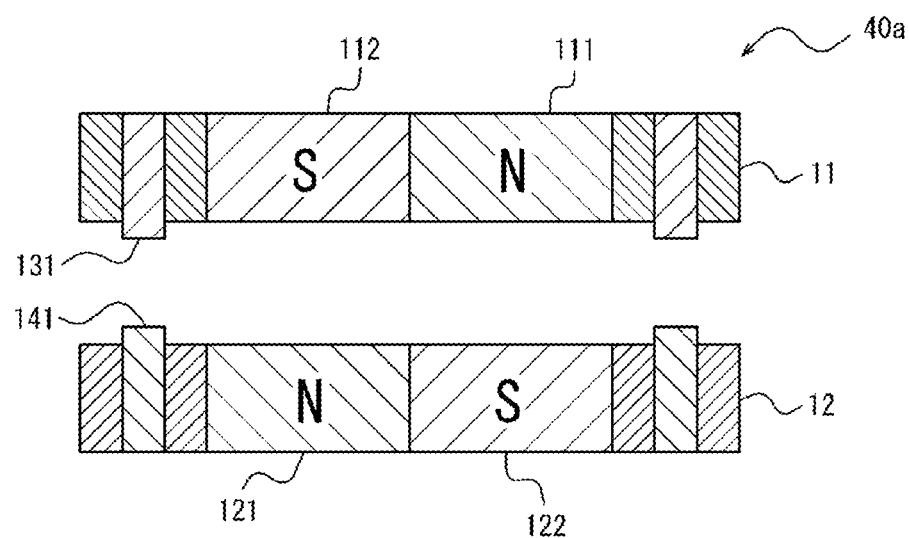
FIG. 9A is a view illustrating an example of a vertical cross-sectional view of the main body portion of the storage device and the unmanned aerial vehicle.
Figure 9B:
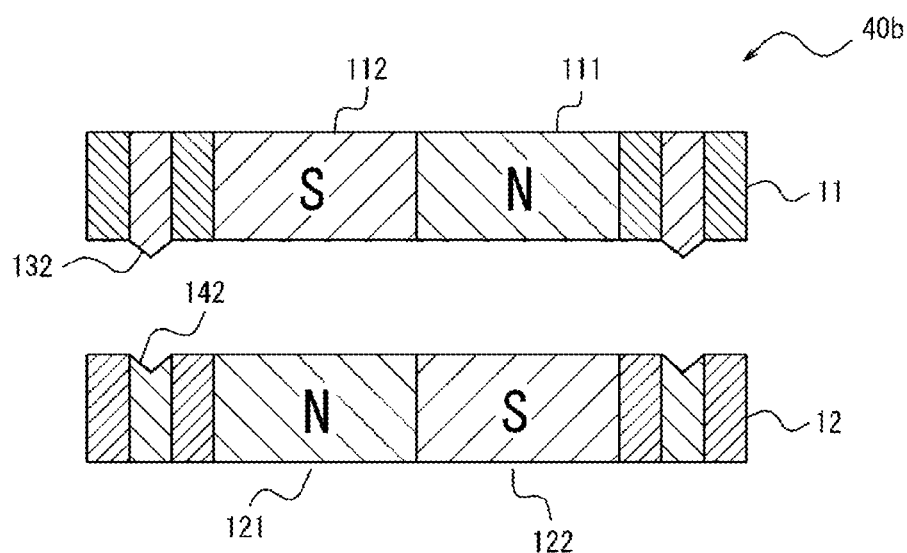
FIG. 9B is a view illustrating an example of a vertical cross-sectional view of the main body portion of the storage device and the unmanned aerial vehicle.
Figure 9C:
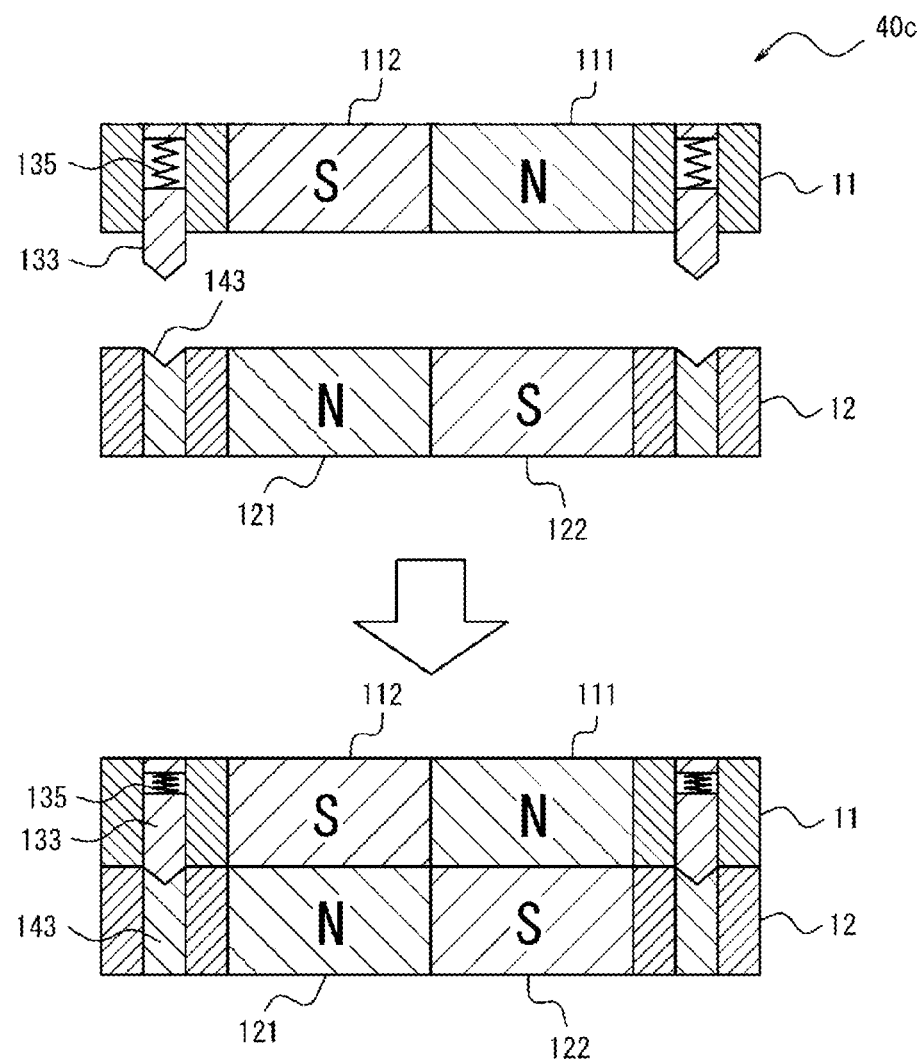
FIG. 9C is a view illustrating an example of a vertical cross-sectional view of the main body portion of the storage device and the unmanned aerial vehicle.

FIGS. 9A to 9C are views illustrating examples of a vertical cross-sectional view of the main body portion 20 of the storage device 10 and the unmanned aerial vehicle 30. FIGS. 9A to 9C illustrate a state in which the space 40 is enlarged. In FIG. 9A, both the connection portions 11 and 12 have a convex structure with respect to electrodes 131 and 141, and the electrodes 131 and 141 protrudes from the surface of magnets 111, 112, 121, and 122. The cross-sectional shape of the electrodes 131 and 141 may be rectangular as in FIG. 9A, but can be made more resistant to wear by cutting the edge into a spherical shape. In addition, by forming one of the electrodes facing each other in a needle shape, it is possible to reduce contact resistance caused by a magnetic force.

FIG. 9B illustrates an example in which one of an electrode 132 of the main body portion 20 and an electrode 142 of the unmanned aerial vehicle 30 has a convex structure and the other has a concave structure, and thus both are fitted at the time of contact. Accordingly, the electrodes 132 and 142 can be reliably brought into contact with each other. At least one of the protrusion and the recess in the electrodes 132 and 142 has a tapered shape such as a conical shape or a wedge-like shape, and thus contact can be further ensured.

In FIG. 9C, a rod-shaped electrode 133 has a spring 135, and the spring 135 of the electrode 133 is compressed when the electrodes 133 and 143 come into contact with each other, thereby exerting a force to bring the electrodes 133 and 143 closer together. This makes it possible to ensure contact between the electrodes 133 and 143 and reduce contact resistance.

Figure 10A:
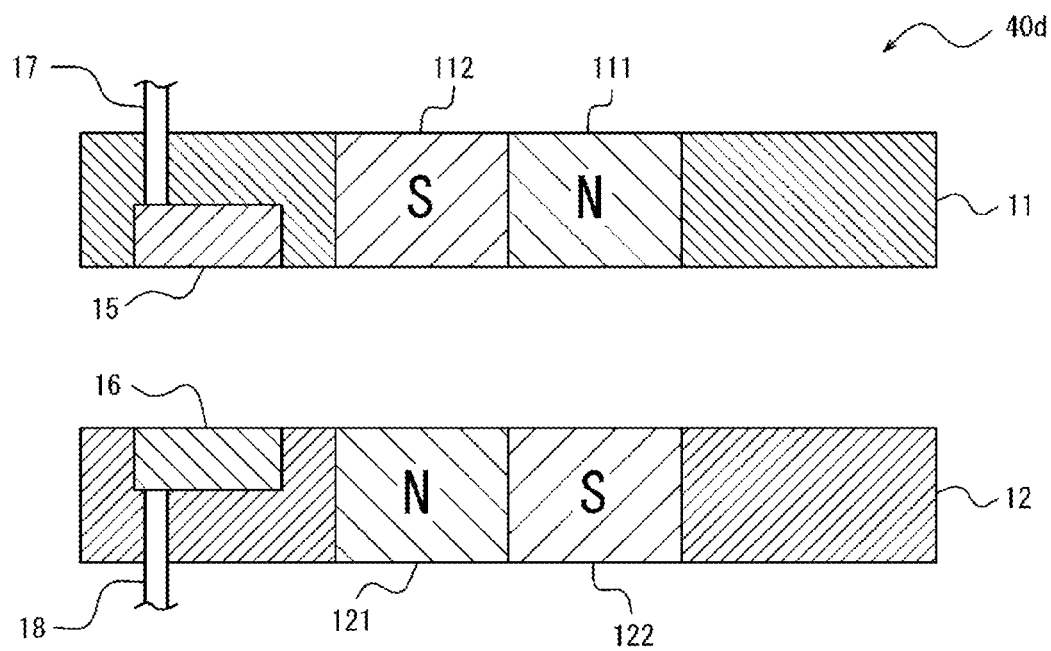
FIG. 10A is a view illustrating an example of a vertical cross-sectional view of the main body portion of the storage device and the unmanned aerial vehicle.
Figure 10B:
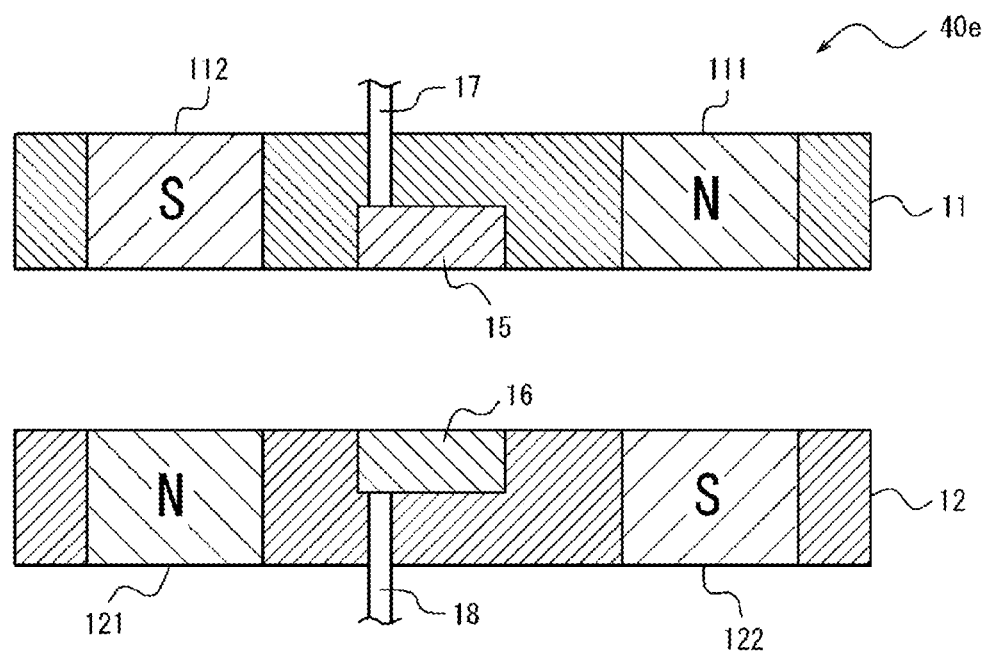
FIG. 10B is a view illustrating an example of a vertical cross-sectional view of the main body portion of the storage device and the unmanned aerial vehicle.

The power transmission from the main body portion 20 to the unmanned aerial vehicle 30 may be performed by a contactless power supply system instead of the electrode. FIGS. 10A and 10B are views illustrating examples of a vertical cross-sectional view of the main body portion 20 of the storage device 10 and the unmanned aerial vehicle 30 that perform contactless power supply. As illustrated in FIGS. 10A and 11B, the connection portion 11 of the main body portion 20 includes a power supply device 15 and a wire 17 in a non-contact manner. The connection portion 12 of the unmanned aerial vehicle 30 includes a power supply device 16 and a wire 18 in a non-contact manner. The arrangement of the power supply device 16 and the wire 18 is a design matter, and can be arbitrarily performed. However, in a case where the magnetic force is used in the contactless power supply, it is possible to prevent the contact of the magnet from being hindered by installing the magnets 111, 112, 121, and 122 of the main body portion 20 and the unmanned aerial vehicle 30 apart to such an extent that there is no influence. Further, when the magnets 111, 112, 121, and 122 are arranged in the periphery and the power supply devices 15 and 16 in a non-contact manner are arranged in the center of the unmanned aerial vehicle 30, alignment is facilitated. Note that, as a contactless power supply system by the power supply devices 15 and 16 in a non-contact manner, any method such as an electromagnetic induction type, a magnetic field resonance type, an electric field coupling type, an evanescent wave type, a microwave type, or a laser type can be used, and the type thereof is not limited.

The magnet on the main body portion 20 side may include a permanent magnet and an electromagnet, the electromagnet may be energized to apply a repulsive force between the main body portion 20 and the unmanned aerial vehicle 30 at the time of departure, and the current may be cut off or an attractive force may be caused to act by a reverse current at the time of return. Accordingly, the unmanned aerial vehicle 30 can smoothly depart and return.

Figure 11A:
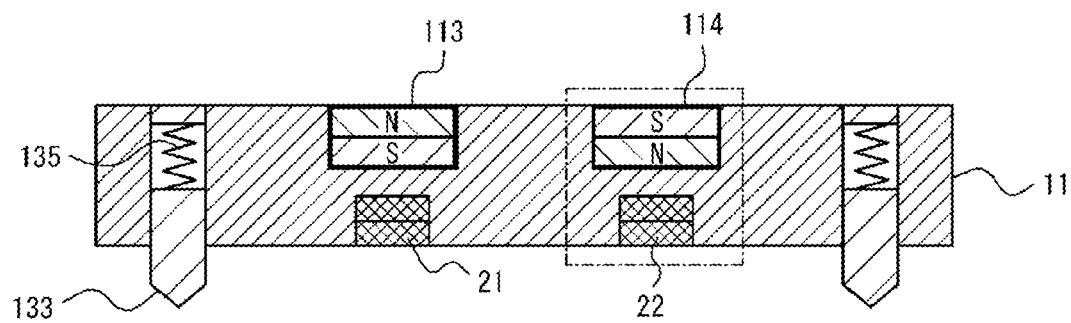
FIG. 11A is a view illustrating an example of a vertical cross-sectional view of the main body portion of the storage device.
Figure 11B:
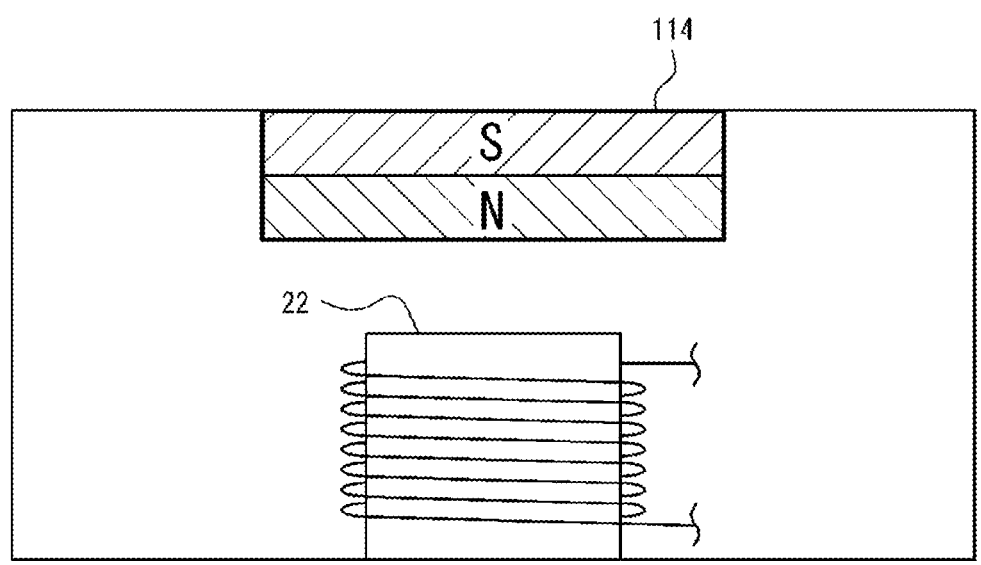
FIG. 11B is a view illustrating magnets and electromagnets included in a connection portion of the main body portion of the storage device.

FIG. 11A is a view illustrating an example of a vertical cross-sectional view of the connection portion 11 included in the main body portion 20 of the storage device 10 for performing such processing. The connection portion 11 includes a magnet 113 having an N pole on an upper side and a magnet 114 having an N pole on a lower side. Electromagnets 21 and 22 are embedded below the magnets 113 and 114. FIG. 11B is an enlarged view of the magnet 114 and the electromagnet 22. When the magnet 114 and the electromagnet 22 are viewed from below, a combination of the magnet 114 and the electromagnet 22, which are permanent magnets, is selected so that the current flowing through the coil of the electromagnet 22 becomes the N pole at zero and the S pole at the maximum energization.

Figure 12A:
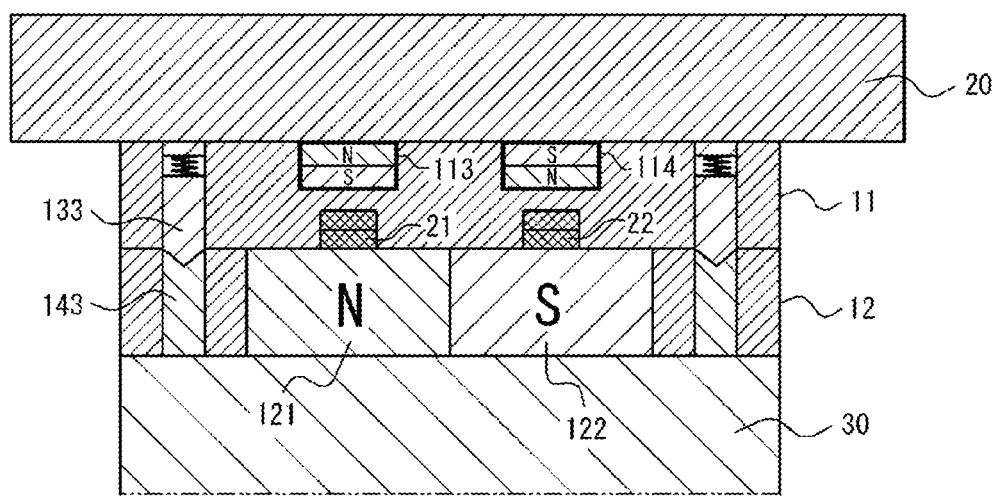
FIG. 12A is a view illustrating an example of a vertical cross-sectional view of the main body portion of the storage device and the unmanned aerial vehicle.
Figure 12B:
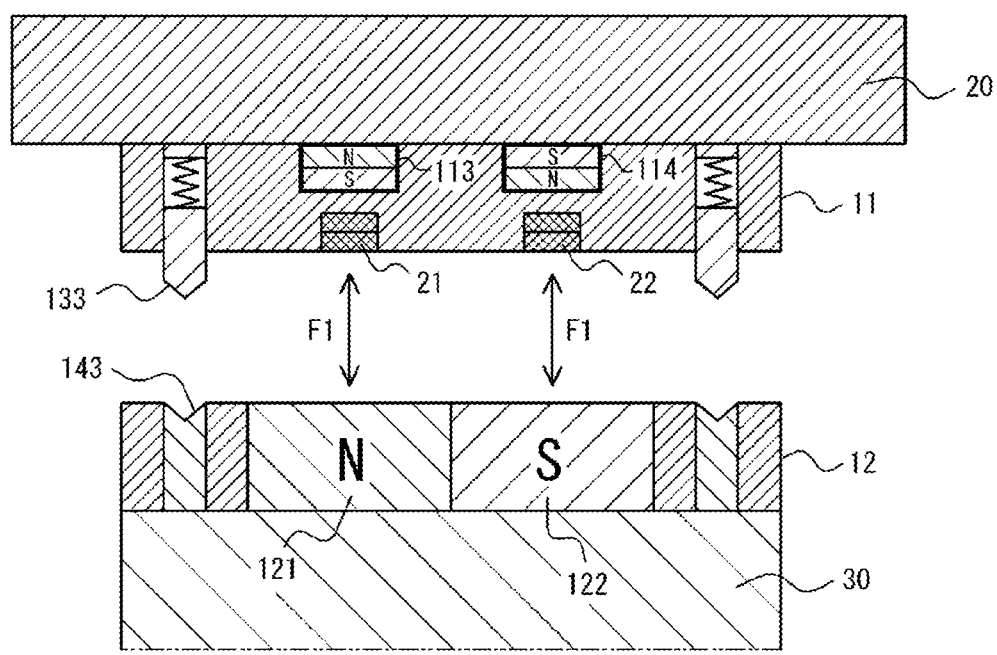
FIG. 12B is a view illustrating an example of a vertical cross-sectional view of the main body portion of the storage device and the unmanned aerial vehicle.
Figure 12C:
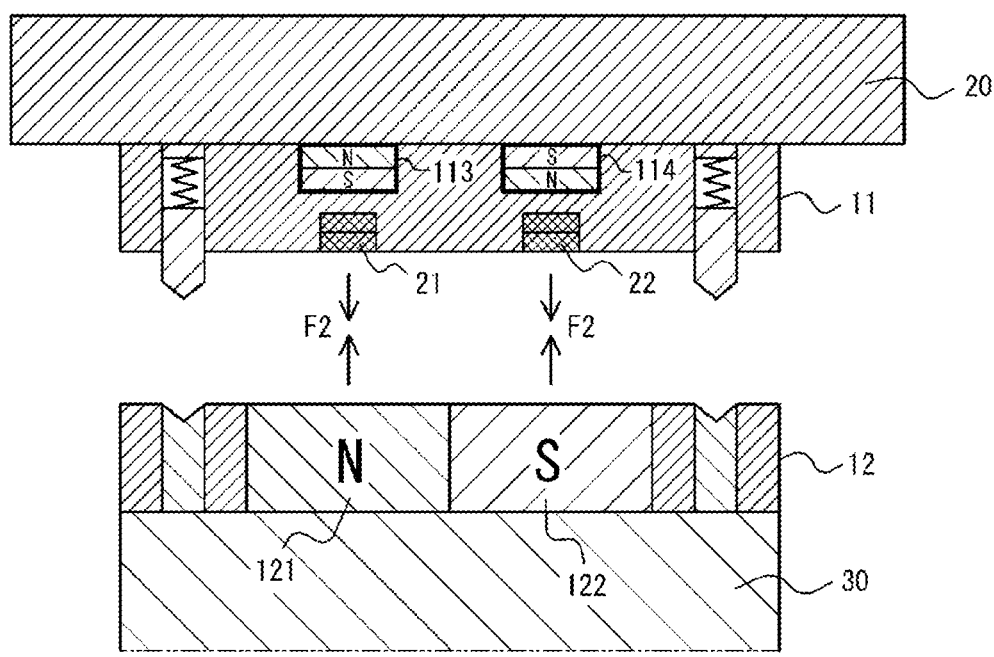
FIG. 12C is a view illustrating an example of a vertical cross-sectional view of the main body portion of the storage device and the unmanned aerial vehicle.

An operation in a case where the magnet on the main body portion 20 side includes a permanent magnet and an electromagnet will be described with reference to FIGS. 12A to 12C. FIGS. 12A to 12C are views illustrating examples of a vertical cross-sectional view of the main body portion 20 of the storage device 10 and the unmanned aerial vehicle 30. In FIG. 12A, the connection portion 11 and the connection portion 12 are in contact with each other and are stationary. In this case, the current of the electromagnets 21 and 22 on the main body portion 20 side is zero, and the unmanned aerial vehicle 30 is fixed by the magnetic force of only the magnets 113 and 114 which are permanent magnets. Therefore, the unmanned aerial vehicle 30 is fixed even when the main body portion 20 is in a power-loss state. In FIG. 12A, $F_m > F_g$, where $F_m$ is the attractive force for lifting the unmanned aerial vehicle 30 upward by the magnetic force of only the permanent magnet, and $F_g$ is the gravity of the unmanned aerial vehicle 30.

FIG. 12B illustrates a state in which the unmanned aerial vehicle 30 is caused to depart. In FIG. 12B, a current flows through the electromagnets 21 and 22, and a repulsive force F1 is applied between the magnet of the connection portion 11 and the magnet of the connection portion 12. It is also possible to depart by energizing the electromagnets 21 and 22 to reduce the magnetic force of the main body portion 20 to zero and allowing the unmanned aerial vehicle 30 to freely fall. However, there is a likelihood that the unmanned aerial vehicle 30 will crash to the ground during a period from the start of fall until the unmanned aerial vehicle drives the propeller 351 to obtain buoyancy. Therefore, it is desirable that the unmanned aerial vehicle 30 depart in a state in which the unmanned aerial vehicle 30 has obtained buoyancy in advance and the electromagnets 21 and 22 are also energized. To this end, assuming that the buoyancy of the unmanned aerial vehicle 30 is $F_p$, the gravity of the unmanned aerial vehicle 30 is $F_g$, and the resultant force of the repulsive forces due to the magnetic force is F1, it is necessary to satisfy the relationship of $F_p < F_g + F1$.

FIG. 12C illustrates a state in which the unmanned aerial vehicle 30 returns to the main body portion 20. In FIG. 12C, an attractive force F2 is applied to the unmanned aerial vehicle 30 by setting the magnetic force of the electromagnets 21 and 22 on the main body portion 20 side to zero (or the opposite polarity to that at the time of departure). Until the unmanned aerial vehicle 30 comes into contact with the main body portion 20, control is performed such that the relationship of $F_p + F_2 > F_g$ is satisfied among the gravity $F_g$, the buoyancy $F_p$, and the resultant force F2 of the attractive forces.

As described above, the main body portion 20 may include an electromagnet for generating a magnetic force that exerts a repulsive force on the upper surface of the unmanned aerial vehicle 30 when the magnet of the main body portion 20 exerts an attractive force on the magnet on the upper surface of the unmanned aerial vehicle 30 and the main body portion 20 and the upper surface of the unmanned aerial vehicle 30 are in contact with each other.

Accordingly, it is possible to continuously control the attractive force between the connection portion 11 and the connection portion 12, and it is possible to smoothly perform the departure and the return of the unmanned aerial vehicle 30.

(Operation Flow)

Figure 13:
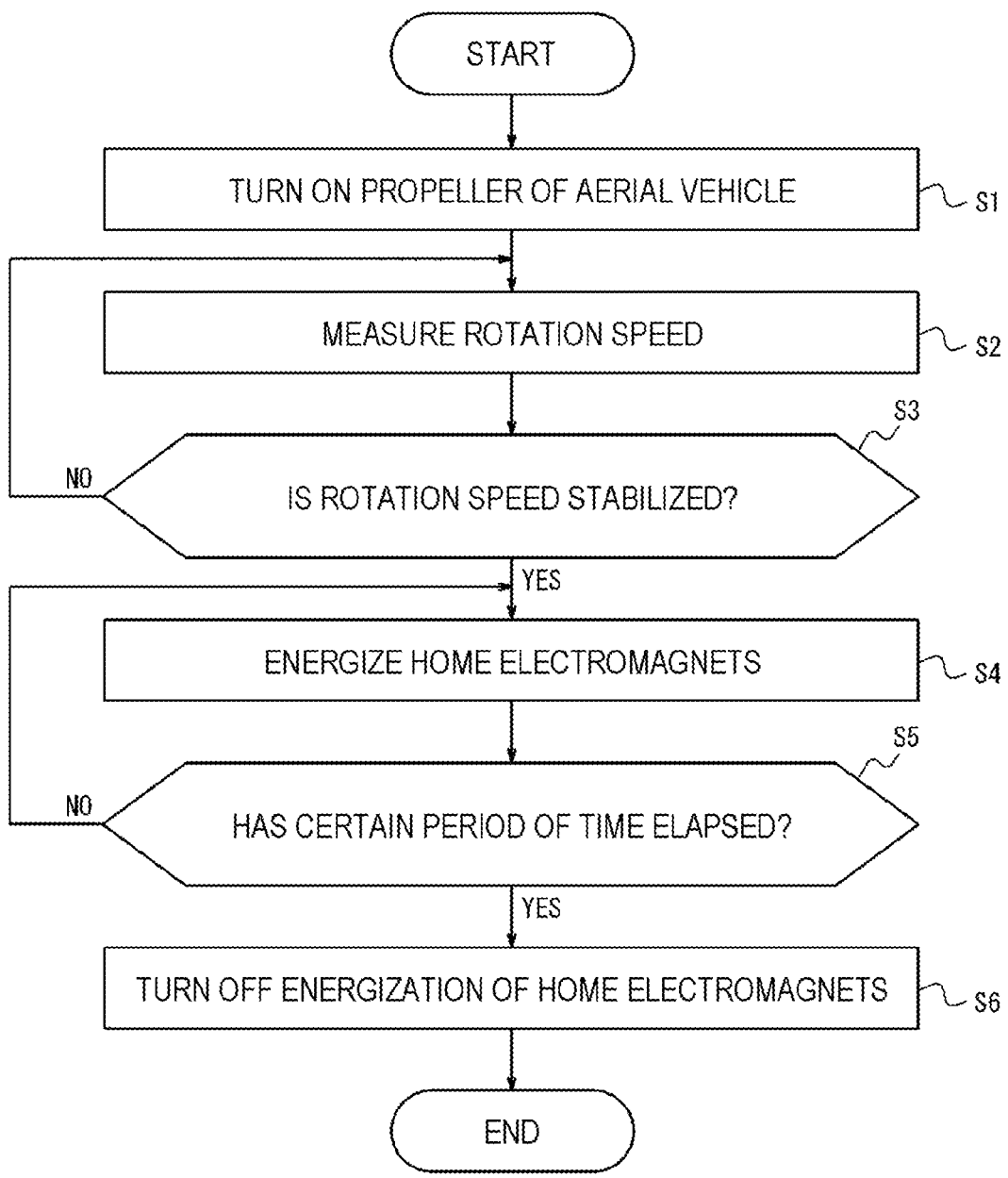
FIG. 13 is a flowchart illustrating an operation procedure in which the unmanned aerial vehicle departs from the storage device.

FIG. 13 is a flowchart illustrating an operation procedure in which the unmanned aerial vehicle 30 departs from the storage device 10. The operation of each step in FIG. 13 is executed under the control of the control unit 31 of the unmanned aerial vehicle 30 or the magnetic force control unit 27 of the main body portion 20.

In step S1, the control unit 31 of the unmanned aerial vehicle 30 turns on the propeller 351 of the unmanned aerial vehicle 30 and starts driving of the motor 352.

In step S2, the magnetic force control unit 27 of the main body portion 20 acquires the rotation speed of the propeller 351 detected by the sensing unit 28. Note that the magnetic force control unit 27 may acquire the rotation speed of the propeller 351 by receiving information indicating the rotation speed from the unmanned aerial vehicle 30.

In step S3, the magnetic force control unit 27 determines whether or not the rotation speed of the propeller 351 is stabilized. Specifically, the magnetic force control unit 27 determines whether or not the unmanned aerial vehicle 30 has obtained buoyancy and reached a rotation speed at which hovering is possible. When the rotation speed has been reached (YES in step S3), the process proceeds to step S4, and when the rotation speed has not been reached (NO in step S3), the process returns to step S2.

In step S4, the magnetic force control unit 27 energizes the electromagnets 21 and 22 provided in the connection portion 11 of the main body portion 20. At this time, the magnetic force control unit 27 performs control to satisfy a relationship of $F_p < F_g + F1$.

In step S5, the magnetic force control unit 27 determines whether or not a certain period of time has elapsed since the start of energization in step S4. This certain period of time is a time sufficient for the unmanned aerial vehicle 30 to leave the main body portion 20, and during this time, the unmanned aerial vehicle 30 departs. When the certain period of time has elapsed (YES in step S5), the magnetic force control unit 27 proceeds to step S6, and returns to step S4 otherwise (NO in step S5).

In step S6, the magnetic force control unit 27 turns off the energization of the electromagnets 21 and 22 provided in the connection portion 11 of the main body portion 20. Then, the magnetic force control unit 27 ends the processing. Note that, at the time of departure of the unmanned aerial vehicle 30, a mechanism for allowing the unmanned aerial vehicle 30 to depart may be provided by applying a force with a cylinder, a spring, or the like so that the conditional expression at the time of departure may not be satisfied.

FIG. 14A is a view for describing a state in which the unmanned aerial vehicle 30 returns to the storage device 10. In FIG. 14A, a position A is a position where the gravity $F_g$ acting on the unmanned aerial vehicle 30 is sufficiently larger than the attractive force $F_m$ by the magnetic force from the magnets 113 and 114 in the state in which the electromagnets 21 and 22 are not energized. That is, the position A corresponds to a position where the attractive force influence by the magnetic force from the main body portion 20 hardly occurs. A position B is a position where Fm and Fg are the same.

Figure 14B:
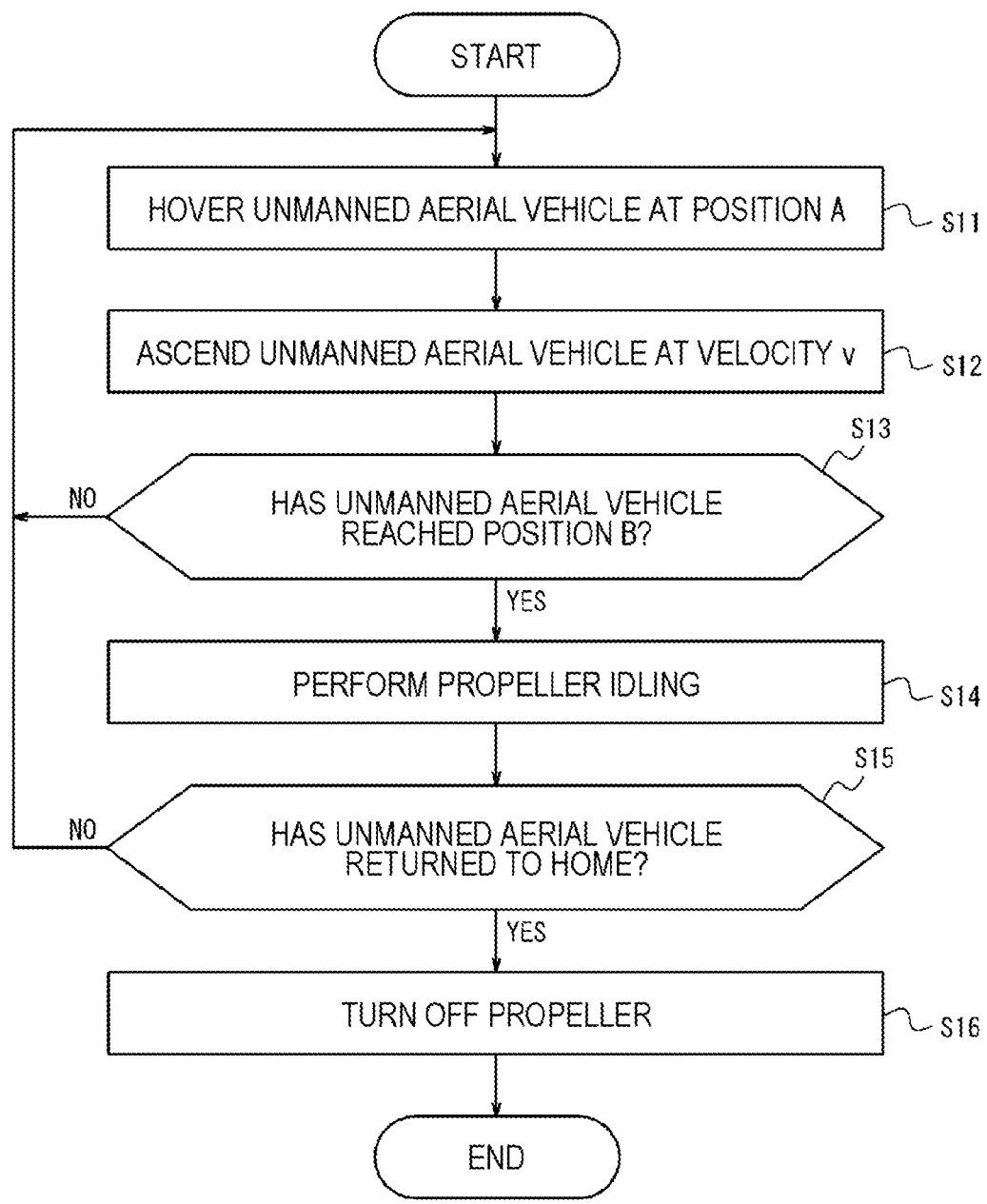
FIG. 14B is a flowchart illustrating an operation procedure in which the unmanned aerial vehicle returns to the storage device.

FIG. 14B is a flowchart illustrating an operation procedure in which the unmanned aerial vehicle 30 returns to the storage device 10. An operation in each step of FIG. 14B is executed under the control of the control unit 31 of the unmanned aerial vehicle 30.

In step S11, the control unit 31 of the unmanned aerial vehicle 30 controls the unmanned aerial vehicle 30 to hover at the position A. The position sensing can be performed, for example, on the basis of a signal of the GNSS receiver 36 or the inertial measurement unit 37.

In step S12, the control unit 31 controls the unmanned aerial vehicle 30 to ascend at a velocity v and approach the main body portion 20. The velocity v is a calculated velocity that reaches from the position A to the position B without buoyancy.

In step S13, the control unit 31 determines whether or not the unmanned aerial vehicle 30 has reached the position B. The control unit 31 proceeds to step S14 when the position B is reached (YES in step S13), and returns to step S11 otherwise (NO in step S13).

In step S14, the control unit 31 controls the unmanned aerial vehicle 30 to perform propeller idling.

The propeller idling is an operation of causing the propeller 351 to stand by (idling) in a zero buoyancy state. Thereafter, the unmanned aerial vehicle 30 travels toward the main body portion 20 by the attractive force of the magnetic force until the unmanned aerial vehicle 30 returns to the main body portion 20.

In step S15, the control unit 31 determines whether or not the unmanned aerial vehicle 30 has returned to the storage position (home) of the main body portion 20. The control unit 31 proceeds to step S16 when the unmanned aerial vehicle has returned (YES in step S15), and returns to step S11 otherwise (NO in step S15).

In step S16, the control unit 31 turns off the propeller 351 of the unmanned aerial vehicle 30. Then, the control unit 31 ends the processing.

Figure 15A:
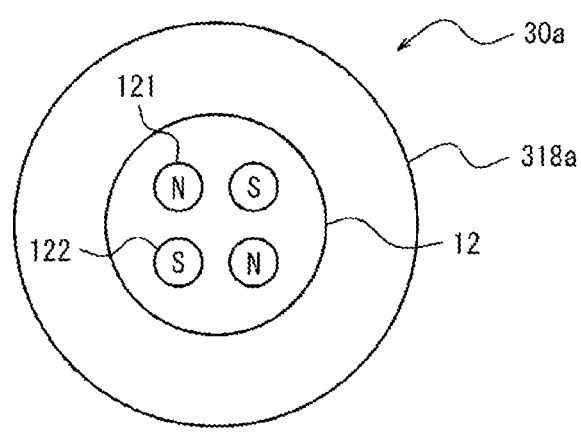
FIG. 15A is a view illustrating a configuration example of an upper surface portion of an unmanned aerial vehicle.
Figure 15B:
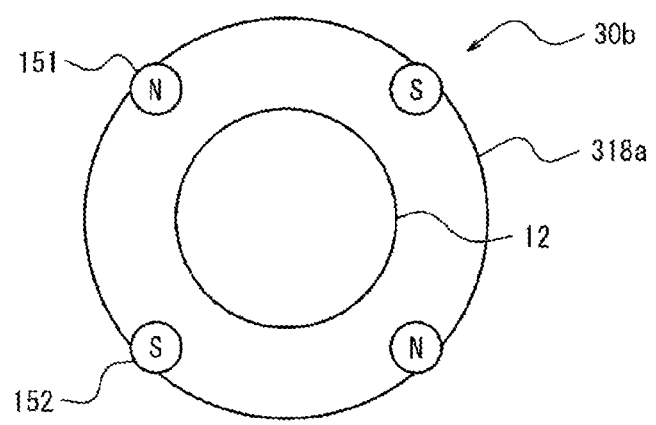
FIG. 15B is a view illustrating a configuration example of an upper surface portion of an unmanned aerial vehicle.
Figure 15C:
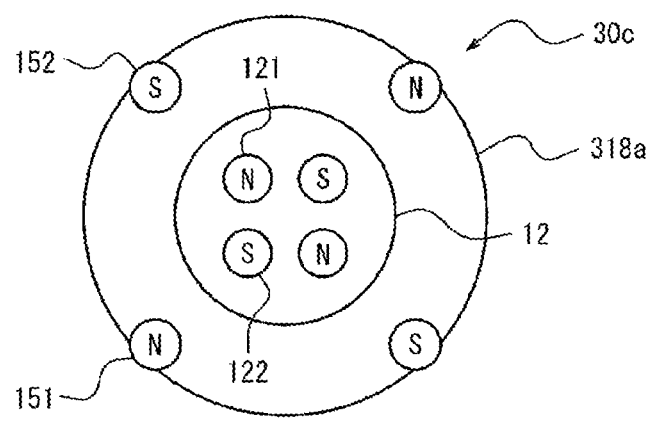
FIG. 15C is a view illustrating a configuration example of an upper surface portion of an unmanned aerial vehicle.

FIGS. 15A to 15C are views illustrating a configuration example of the upper surface portion of the unmanned aerial vehicle 30. In the above description, as illustrated in FIG. 15A, the configuration in which the magnets 121 and 122 are provided only on the connection portion 12 of the unmanned aerial vehicle 30 has been described. However, in order to enhance the correction effect by the magnetic force of the yaw angle of the unmanned aerial vehicle 30, it is desirable to provide the magnets 151 and 152 in the vicinity of the outer periphery of the unmanned aerial vehicle 30 as much as possible as illustrated in FIG. 15B. When the magnets 151 and 152 are provided in the vicinity of the outer periphery of the unmanned aerial vehicle 30, a bumper 318a is provided to be located at the same height as the connection portion 12. Further, as illustrated in FIG. 15C, in addition to providing magnets 121 and 122 on the connection portion 12, magnets 151 and 152 may also be provided on the bumper 318a. With such an arrangement, the degree of freedom in designing the arrangement of the magnets used for angle matching and fixing the unmanned aerial vehicle 30 can be increased.

Note that a movable spacer may be arranged on the upper part of the magnets 121 and 122 on the unmanned aerial vehicle 30 side after the unmanned aerial vehicle 30 is detached from the main body portion 20 so that the unmanned aerial vehicle 30 can be detached by its own weight when approaching and sticking to the hardware or the like during flight. In addition, in a case where the magnets 121 and 122 on the unmanned aerial vehicle 30 side are implemented by electromagnets, it is possible to save power consumption of the unmanned aerial vehicle 30 by cutting off the current of the electromagnets while the unmanned aerial vehicle 30 is in flight.

The present disclosure is not limited to the embodiments described above. For example, a plurality of blocks in the block diagrams may be integrated, or one block may be divided. The plurality of steps in the flowchart may be executed in parallel or in a different order depending on throughput of a device that executes each step or as necessary, instead of being chronologically executed according to the description. Further, modifications can be made within the gist of the present disclosure.

REFERENCE SIGNS LIST

1 Inspection system
10 Storage device
11, 12 Connection portion
15, 16 Power supply device
17, 18 Wire
20 Main body portion
21, 22 Electromagnet
24 Airflow hood
25 Control unit
27 Gripping mechanism control unit
28 Sensing unit
30 Unmanned aerial vehicle
31 Control unit
32 Memory
33 Communication unit
34 Camera
35 Rotary blade mechanism
36 GNSS receiver
37 Inertial measurement unit
38 Magnetic compass
39 Barometric altimeter
40 Space
50 Terminal
100 Manhole
101 Accumulated water
111 to 114, 121 to 124 Magnet
115 to 117, 125 to 127 Electrode
131 to 133, 141 to 143 Electrode
135 Spring
151, 152 Magnet
311 Control box
318 Bumper
351 Propeller
352 Motor

The invention claimed is:

1. A storage device for storing an unmanned aerial vehicle, the storage device comprising:
a main body portion having a magnetic body, wherein the magnetic body applies a magnetic force to the unmanned aerial vehicle, the unmanned aerial vehicle includes an upper surface, and the upper surface includes a magnet, wherein
the main body portion comprises a plurality of magnets, the plurality of magnets including a first magnet having an N pole on an upper side of the first magnet and a second magnet having an S pole on an upper side of the second magnet.

2. The storage device according to claim 1, wherein the main body portion has the same number of a first set of magnets having N poles on the upper side of the first set of magnets and a second set of magnets having S poles on the upper side of the second set of magnets.

3. The storage device according to claim 1, wherein the main body portion further comprises a first electrode, and the first electrode supplies power to a second electrode placed on the upper surface of the unmanned aerial vehicle when the plurality of magnets in the main body portion exerts an attractive force on the magnet placed on the upper surface of the unmanned aerial vehicle as the main body portion and the upper surface are coming into contact with each other.

4. The storage device according to claim 1, wherein the main body portion further includes an electromagnet for generating the magnetic force that exerts a repulsive force on the upper surface of the unmanned aerial vehicle when the plurality of magnets included in the main body portion exerts an attractive force on the magnet placed on the upper surface of the unmanned aerial vehicle as the main body portion and the upper surface are in contact with each other.

5. The storage device according to claim 1, wherein the storage device is installed above an upper hole of a utility access hole.

6. The storage device according to claim 1, wherein the unmanned aerial vehicle captures an image of the inside of a utility access hole for inspecting the utility access hole while autonomously controlling a flight of the unmanned aerial vehicle.

7. The storage device according to claim 1,
wherein the main body portion comprises the same number of magnets as the number of magnets on the upper surface of the unmanned aerial vehicle, and
the plurality of magnets included in the main body portion are placed such that a first placement of the first magnet and the second magnet in the main body portion of the storage device aligns with a second placement of a third magnet having the N pole on an upper side of the third magnet and a fourth magnet having the S pole on an upper side of the fourth magnet on the upper surface of the unmanned aerial vehicle at once or more positions while the unmanned aerial vehicle makes one rotation about a vertical axis under the storage device.

8. The storage device according to claim 7, wherein the main body portion includes the same number of a first set of magnets having N poles on the upper side of the first set of magnets and a second set of magnets having S poles on the upper side of the second set of magnets.

9. The storage device according to claim 7, wherein the main body portion further comprises a first electrode, and the first electrode supplies power to a second electrode placed on the upper surface of the unmanned aerial vehicle when the plurality of magnets in the main body portion exerts an attractive force on the magnet placed on the upper surface of the unmanned aerial vehicle as the main body portion and the upper surface are coming into contact with each other.

10. The storage device according to claim 7, wherein the main body portion further includes an electromagnet for generating the magnetic force that exerts a repulsive force onto the upper surface of the unmanned aerial vehicle when the plurality of magnets included in the main body portion exerts an attractive force on the magnet placed on the upper surface of the unmanned aerial vehicle as the main body portion and the upper surface are in contact with each other.

11. An unmanned aerial vehicle comprising:
a propeller; and
an upper surface, the upper surface including a plurality of magnets for coming in contact with a storage device for storing the unmanned aerial vehicle, wherein the plurality of magnets including a first magnet having an N pole on an upper side of the first magnet and a second magnet having an S pole on an upper side of the second magnet.

12. The unmanned aerial vehicle according to claim 11, wherein one or more magnets of the plurality of magnets receives a magnetic force from a magnetic body of a main body portion of the storage device.

13. The unmanned aerial vehicle according to claim 11, wherein the storage device is installed above an upper hole of a utility access hole.

14. The unmanned aerial vehicle according to claim 11, wherein the unmanned aerial vehicle captures an image of the inside of a utility access hole for inspecting the utility access hole while autonomously controlling a flight of the unmanned aerial vehicle.

15. A system comprising:
a storage device comprising:
  a main body portion having a magnetic body with a plurality of magnets; and
an unmanned aerial vehicle comprising:
  a propeller; and
  an upper surface, the upper surface including a magnet,
  wherein the magnetic body applies a magnetic force to the unmanned aerial vehicle, and
  the plurality of magnets including a first magnet having an N pole on an upper side of the first magnet and a second magnet having an S pole on an upper side of the second magnet.

16. The system according to claim 15, wherein the main body portion comprises the same number of magnets as the number of magnets on the upper surface of the unmanned aerial vehicle, and
the plurality of magnets included in the main body portion are placed such that a first placement of the first magnet and the second magnet in the main body portion of the storage device aligns with a second placement of a third magnet having the N pole on an upper side of the third magnet and a fourth magnet having the S pole on an upper side of the fourth magnet on the upper surface of the unmanned aerial vehicle at one or more positions while the unmanned aerial vehicle makes one rotation about a vertical axis under the storage device.

17. The system according to claim 15, wherein the main body portion has the same number of a first set of magnets having N poles on the upper side of the first set of magnets and a second set of magnets having S poles on the upper side of the second set of magnets.

18. The system according to claim 15, wherein the main body portion further comprises a first electrode, and the first electrode supplies power to a second electrode placed on the upper surface of the unmanned aerial vehicle when the plurality of magnets in the main body portion exerts an attractive force on the magnet placed on the upper surface of the unmanned aerial vehicle as the main body portion and the upper surface are coming into contact with each other.

* * * * *